(12) United States Patent
Van Thiel

(10) Patent No.: US 11,052,894 B2
(45) Date of Patent: Jul. 6, 2021

(54) ELECTRONICALLY CONTROLLABLE BRAKING SYSTEM AND METHOD FOR CONTROLLING THE ELECTRONICALLY CONTROLLABLE BRAKING SYSTEM

(71) Applicant: WABCO GmbH, Hannover (DE)

(72) Inventor: Julian Van Thiel, Grossburgwedel (DE)

(73) Assignee: ZF CV SYSTEMS HANNOVER GMBH, Hannover (DE)

( * ) Notice: Subject to any disclaimer, the term of this patent is extended or adjusted under 35 U.S.C. 154(b) by 117 days.

(21) Appl. No.: 16/495,421

(22) PCT Filed: Mar. 19, 2018

(86) PCT No.: PCT/EP2018/056786
§ 371 (c)(1),
(2) Date: Sep. 19, 2019

(87) PCT Pub. No.: WO2018/172233
PCT Pub. Date: Sep. 27, 2018

(65) Prior Publication Data
US 2020/0023827 A1  Jan. 23, 2020

(30) Foreign Application Priority Data

Mar. 21, 2017  (DE) .......................... 102017002718.8

(51) Int. Cl.
*B60T 13/68* (2006.01)
*B60T 13/70* (2006.01)
(Continued)

(52) U.S. Cl.
CPC ............ *B60T 13/683* (2013.01); *B60T 13/70* (2013.01); *B60W 10/182* (2013.01); *B60W 10/188* (2013.01)

(58) Field of Classification Search
CPC ... B60T 7/04; B60T 7/02; B60T 7/042; B60T 7/12; B60T 13/686; B60T 13/70;
(Continued)

(56) References Cited

U.S. PATENT DOCUMENTS 3,999,075 A * 12/1976 Johnson .................. B60T 13/22
303/63
2002/0167219 A1* 11/2002 Kemer .................. F15B 20/001
303/7

(Continued)

FOREIGN PATENT DOCUMENTS

DE          19935979 A1    4/2001
DE       102008009043 B3    5/2009

(Continued)

*Primary Examiner* — Robert A. Siconolfi
*Assistant Examiner* — San M Aung
(74) *Attorney, Agent, or Firm* — Leydig, Voit & Mayer, Ltd.

(57) ABSTRACT

An electronically controllable brake system, in particular electronically controllable pneumatic brake system, for a utility vehicle, in particular utility vehicle, includes: at least one service brake circuit with service brakes and a service brake control module, a service-brake pressure being feedable to the service brakes, the service-brake control module generating a service-brake control signal as a function of a braking specification, the service-brake pressure being generatable as a function of the service-brake control signal and specified to the service brakes, for implementation of the
(Continued)

braking specification via the at least one service brake circuit, under electrical control by the service-brake control module; and a parking brake circuit with spring-loaded brakes, a parking-brake brake pressure being feedable to the spring-loaded brakes, the parking-brake brake pressure being generatable as a function of the braking specification and specified to the spring-loaded brakes, in order to implement the braking specification.

29 Claims, 9 Drawing Sheets

(51) Int. Cl.
*B60W 10/18* (2012.01)
*B60W 10/188* (2012.01)

(58) Field of Classification Search
CPC .......... B60T 13/74; B60T 13/68; B60T 13/66; B60T 13/662; B60T 13/263; B60T 7/20; B60T 8/1708; B60T 8/323; B60T 8/327; B60W 10/182; B60W 10/188
USPC ................................................ 303/15; 701/15
See application file for complete search history.

(56) References Cited

U.S. PATENT DOCUMENTS

| | | | |
|---|---|---|---|
| 2004/0012249 A1* | 1/2004 | Koelzer | ............. B60G 17/0523 303/3 |
| 2007/0170774 A1 | 7/2007 | Gerum et al. | |
| 2011/0144855 A1 | 6/2011 | Herges et al. | |
| 2019/0337503 A1 | 11/2019 | Otremba | |

FOREIGN PATENT DOCUMENTS

| | | |
|---|---|---|
| DE | 102014006613 A1 | 11/2015 |
| DE | 102015008377 A1 | 12/2016 |
| DE | 102015011296 A1 | 3/2017 |
| EP | 0394065 A2 | 10/1990 |
| EP | 1571061 A1 | 9/2005 |
| EP | 2090481 B1 | 11/2013 |
| EP | 2942249 A1 | 11/2015 |
| WO | WO 2004098967 A2 | 11/2004 |
| WO | WO 2009152982 A2 | 12/2009 |
| WO | WO 2017001546 A1 | 1/2017 |

* cited by examiner

ELECTRONICALLY CONTROLLABLE BRAKING SYSTEM AND METHOD FOR CONTROLLING THE ELECTRONICALLY CONTROLLABLE BRAKING SYSTEM

CROSS-REFERENCE TO PRIOR APPLICATIONS

This application is a U.S. National Phase application under 35 U.S.C. § 371 of International Application No. PCT/EP2018/056786, filed on Mar. 19, 2018, and claims benefit to German Patent Application No. DE 10 2017 002 718.8, filed on Mar. 21, 2017. The International Application was published in German on Sep. 27, 2018 as WO 2018/172233 under PCT Article 21(2).

FIELD

The invention relates to an electronically controllable brake system and to a method for controlling said electronically controllable brake system.

BACKGROUND

A brake system in a vehicle, preferably a utility vehicle, can be provided with two or more service brake circuits in which a service-brake brake pressure which is applied to service brakes is set, and with a parking brake circuit, in which a parking-brake brake pressure which is applied to spring-loaded brakes is set. The application of the service-brake brake pressure to the service brake for example takes place via a pressure modulator which outputs a service-brake brake pressure to the respective service brakes according to a service-brake braking specification in the form of a pneumatic service-brake control pressure or an electrical service-brake control signal.

In a normal operation, the specification to the pressure modulator is issued electrically via the service-brake control signal, wherein the service-brake control signal is determined and output by a service-brake control module as a function of a manually specified service-brake braking specification and/or as a function of an assistance braking specification which is requested in an automated fashion by an assistance system. In the case of redundancy, e.g. when there is an electrical failure of the service-brake control module, the specification to the actuator takes place via the service-brake control pressure which is specified to the pressure modulator via a pneumatic redundancy port and which is output, for example, by a service-brake activation device which is embodied as an electropneumatic service-brake valve, with a brake pedal, as a function of the service-brake braking specification.

The parking brake circuit serves mainly to park the vehicle in a parking situation or to carry out auxiliary braking or emergency braking during travel in that a parking-brake brake pressure is applied under control by a parking-brake control module, as a function of which parking-brake brake pressure the application of spring-loaded brakes is carried out, wherein the parking-brake brake pressure is reduced for the application of the brakes. For example, such a parking-brake control module or a hand-brake module is described in DE 10 2015 008 377 A1. The parking brake circuit and the service brake circuits conventionally operate separately from one another.

In specific applications, it is possible to replace the redundancy mechanism, described above, of the service brake with the alternative actuation of the handbrake circuit. For this purpose, the electrical voltage supply of the parking brake must usually be provided independently of the voltage supply of the service brake.

In the event of a failure of the electrical actuation of the service-brake circuits via the service-brake control module, it is possible, as described, for a pneumatic first fallback level, which is controlled by the driver, to be formed. However, if the driver is not available as a fallback level, since he is e.g. inattentive or in the event of relatively highly automated driving maneuvers not being in place, a second fallback level can be formed which can intervene under automated and electronic control, wherein the existing parking brake circuit is used for this purpose. The automated braking request is fed to the parking-brake control module after detection of the electrical failure in one of the service brake circuits, which parking-brake control module can correspondingly activate the spring-loaded brakes by specifying the parking-brake brake pressure, in order to compensate for the electrical failure of the service brakes. Alternatively, the automated braking request can be fed continuously to the parking-brake control module, and when a failure is detected in at least one of the service brake circuits by the parking-brake control module the latter can correspondingly activate the spring-loaded brakes by specifying the parking-brake brake pressure. However, in this case, under certain circumstances braking is carried out at only one vehicle axle on which the spring-loaded brakes are arranged in the parking brake circuit. This can lead to limited deceleration performance and, under certain circumstances, to additional instabilities during travel.

In order to avoid this, EP 2 090 481 B1 describes an electronically controllable brake system in which a rear-axle service brake circuit is controlled by a rear-axle service brake control module, and a front-axle service brake circuit is controlled by a front-axle service brake control module. The parking brake control module for the parking brake circuit is integrated into the front-axle service brake control module, wherein the parking brake circuit controls spring-loaded brakes on the rear axle. The rear-axle service brake control module and the components of the rear-axle service brake circuit are supplied with energy by a first energy source, and the front-axle service brake control module and the parking-brake control module with the correspondingly assigned components are supplied with energy by a second energy source.

In the event of a failure of the first energy source, i.e. the rear-axle service brake circuit with the service brakes on the rear axle, the front axle can be braked further via the front-axle service brake circuit and the rear axle can be braked via the parking brake circuit, so that both vehicle axles can be continued to be braked. The parking brake circuit therefore compensates the failure of the rear-axle service brake circuit in that instead of being braked with the service brakes it is braked with the spring-loaded brakes on the rear axle. In the event of a failure of a second energy source, i.e. both of the parking brake circuit on the rear axle and of the front-axle service brake circuit, a service-brake control signal is output by the rear-axle service brake control module, which service-brake control signal is, as in normal operation, transmitted to the rear-axle pressure modulator but additionally also to a trailer control valve of the vehicle. The trailer control valve generates a corresponding control pressure which, when it is present, is transmitted to the trailer in order to bring about braking there and at the same time also via a redundancy pressure line to the pneumatic redundancy port on the front-axle pressure modulator. The rear axle and the front axle are therefore braked, as in normal operation, via the service brakes, and the front axle is also controlled by the rear-axle service brake control module.

The parking-brake control module can continue to output a parking-brake control pressure to the trailer control valve which inverts this and passes it onto the service brakes of the trailer, in order to be able to implement a parking brake function also in the trailer.

Therefore, in the prior art it is proposed to actuate each service brake circuit via separate control modules and to compensate a failure of an energy source and therefore of at least one service brake circuit by virtue of the fact that the respectively still functioning brake circuit or circuits performs/perform braking on the vehicle axle where there has been a failure, so that even in the case of redundancy both vehicle axles can still be used for braking.

It is disadvantageous here that no such compensation can take place in electronically controlled brake systems which actuate the service brakes on the rear axle and on the front axle and, if appropriate, on further vehicle axles via the pressure modulator via only one central service-brake control module, since in the event of a failure of the energy source or of individual electrical components of the respective service brake circuit the central service-brake control module can no longer perform the electrical actuation of the service brakes or of the pressure modulators, connected upstream, on individual vehicle axles. Therefore, if they are present in the corresponding brake system, it is only possible to switch over to the pneumatic first fallback level which is controlled by the driver. However, a purely electronic braking specification as described in EP 2 090 481 B1 or a possible assistance braking specification which is specified in an automated fashion can no longer be implemented.

If, furthermore, pneumatically redundant intervention by the driver in the brake system is not possible by means of the electropneumatic service brake valve, since, as in EP 2 090 481 B1, a purely electrically operated service brake activation device is provided instead of the electropneumatic service brake valve, it is not possible either to have recourse to the first fallback level, in order, if appropriate, also to manually override an assistance braking specification which is requested in automated fashion. In such a case, in the event of an electrical failure during which a service-brake braking specification can no longer be received via the purely electrically operated service-brake activation device, the driver therefore cannot intervene in the braking via the service-brake activation device.

SUMMARY

In an embodiment, the present invention provides an electronically controllable brake system, in particular electronically controllable pneumatic brake system, for a vehicle, in particular utility vehicle, comprising: at least one service brake circuit with service brakes and a service brake control module, a service-brake brake pressure being feedable to the service brakes, the service-brake control module being configured to generate a service-brake control signal as a function of a braking specification, the service-brake brake pressure being generatable as a function of the service-brake control signal and specified to the service brakes, for implementation of the braking specification via the at least one service brake circuit, under electrical control by the service-brake control module; a parking brake circuit with spring-loaded brakes, a parking-brake brake pressure being feedable to the spring-loaded brakes, the parking-brake brake pressure being generatable as a function of the braking specification and specified to the spring-loaded brakes, in order to implement the braking specification via the parking brake circuit; an inverter control valve with an inverter output and/or a redundancy output, the inverter control valve being configured to generate an inverter control pressure and to output the inverter control pressure via the inverter output and/or the redundancy output, the inverter control pressure being inversely proportional to the parking-brake brake pressure and/or a parking-brake control pressure which specifies the parking-brake brake pressure, which parking-brake brake pressure and parking-brake control pressure are applyable in order to implement the braking specification in the parking brake circuit via the spring-loaded brakes; and a switching valve, the switching valve having two switching-valve switched positions, such that when a service-brake specification which is requested manually by a driver via a service brake valve is present, the switching valve is set to a first switching-valve switched position in which switched position the service-brake brake pressure is specifiable as a function of the service-brake braking specification which is specified via the service brake valve, and otherwise the switching valve being set a second switching-valve switched position in which the service-brake brake pressure is specifiable as a function of the inverter control pressure which is specified by the inverter control valve.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
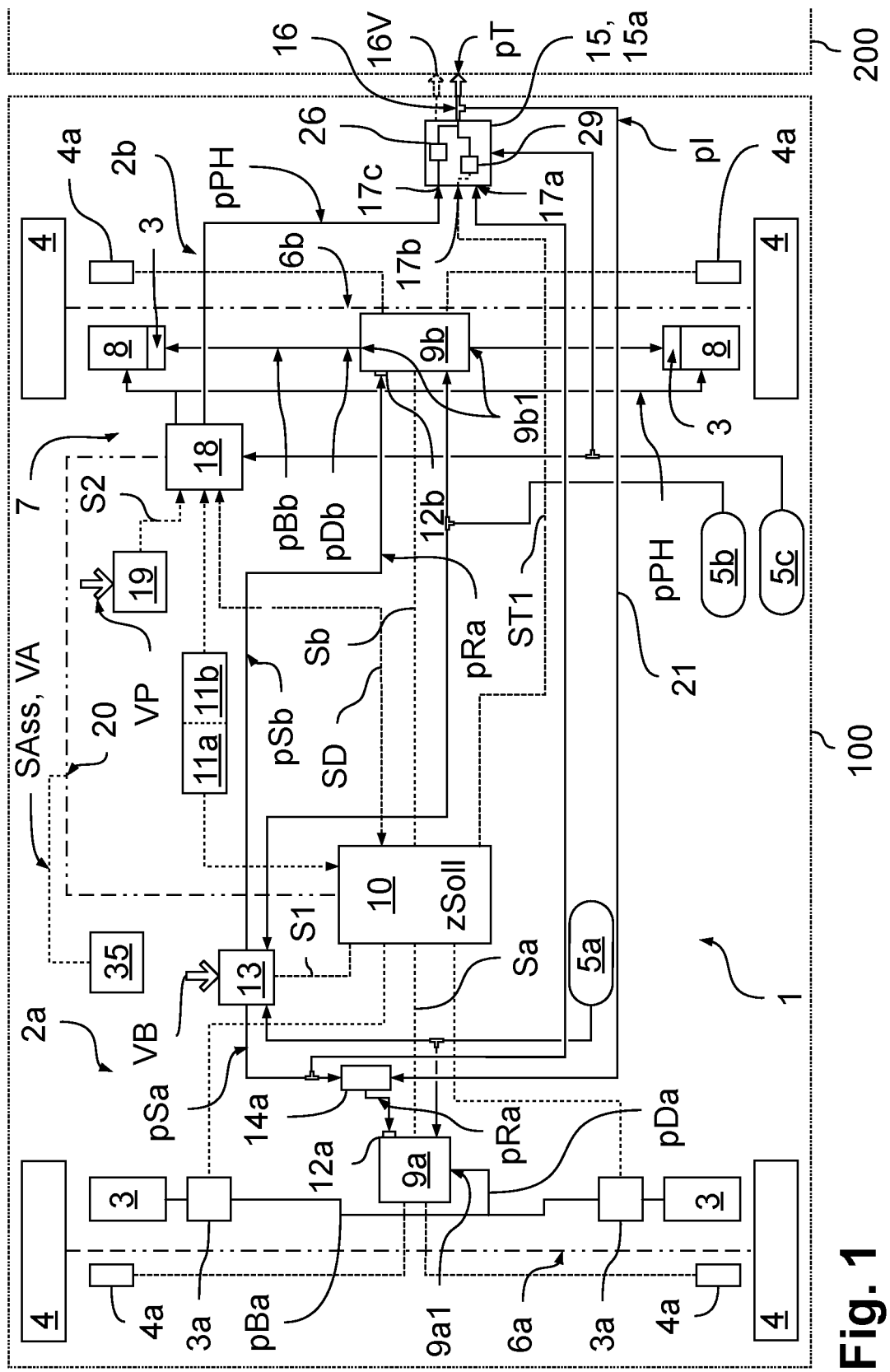
FIG. 1 shows an electronically controllable brake system with an electrically controllable parking brake according to a first embodiment.

In an embodiment, the present invention provides an electronically controllable brake system and a method for controlling this electronically controllable brake system which permits in a simple and reliable fashion redundant actuation of the service brakes by the driver.

According to the invention, there is accordingly provision to arrange a switching valve in an electronically controllable brake system, wherein the switching valve can be placed in two switching valve switched positions, and to specify a service-brake brake pressure for activating service brakes in at least one service brake circuit of the brake system as a function of the switching-valve switched position, in such a way that when a service-brake braking specification requested manually by the driver via an electropneumatic service brake valve is present, the switching valve can be moved into a first switching-valve switched position, in order to define the service-brake brake pressure in a situation-dependent fashion as a function of the service-brake braking specification which is specified via the electropneumatic service brake valve, and the switching valve can otherwise be moved into a second switching-valve switched position in which the service-brake brake pressure is defined as a function of an inverter control pressure, wherein the inverter control pressure is specified, in particular, for redundant actuation of the service brakes.

This already provides the advantage that, through a corresponding selection of the switching-valve switched position, the service-brake braking request which is specified manually by the driver via the service brake valve can be given a higher priority, in a situationally conditioned fashion, than a braking specification which is requested in some other way, as a function of the inverter control pressure. The service-brake braking specification is for this purpose preferably applied pneumatically by the service brake valve, and the service-brake brake pressure is generated as a function of this pneumatic service-brake braking specification, so that the service-brake braking specification can still be specified by the driver via the service brake valve even in the case of an electrical failure.

The switching can take place in a situationally conditioned fashion, for example when a redundant service-brake braking specification by the driver has been sensed and stronger braking is requested via this service-brake braking specification than via some other redundant braking specification which is not requested by the driver and which is currently being implemented at the respective time. Otherwise, there can also be provision that when a service-brake braking request by the driver is sensed another currently implemented braking specification, which causes, in particular, a stronger braking effect than the manually requested service-brake braking specification, is ended in a controlled fashion and subsequently the switching valve is moved into the first switching-valve switched position in which the service-brake braking specification can be implemented by the driver. Instabilities or hazardous situations during the switching can be avoided by means of this procedure.

The switching of the switching valve into the first switching-valve switched position when a driver's request is present can take place here in a pneumatically or electrically controlled manner depending on the type of switching valve, i.e. the switching valve is switched automatically into the first switching-valve switched position by virtue of the fact that a certain service-brake brake pressure is present at the switching valve, or the service-brake brake pressure is measured, preferably with a pressure sensor, and the switching valve is moved into the first switching-valve switched position under electrical control as a function of the measurement.

The inverter control pressure, as a function of which the service-break brake pressure can be specified via the switching valve when a pneumatically manually requested service-brake braking specification is not present, preferably serves to permit a braking operation to be carried out in the service brake circuit even when there is an electrical failure in the at least one service brake circuit. An electrical failure occurs within the scope of the invention, in particular, when it is not possible to specify the service-brake brake pressure as a function of an electrically specifiable service-brake control signal, wherein the service-brake control signal can be electrically generated and output by a service-brake control module which controls, in particular, the service brake circuits on the basis of, for example, the service-brake braking specification. That is to say when there is an electrical failure in the service brake circuit, the desired braking specification cannot be implemented under electrical control by the service-brake control module. An electrical failure includes here, in particular even the case in which generation of the service-brake control signal already fails, e.g. because the service-brake control module has an electrical defect and therefore it is not possible to specify the service-brake brake pressure as a function of the service-brake functional signal, which in this case is not present. Furthermore, an electrical failure can occur if although a service-brake control signal can be generated and output by the service-brake control module, said service-brake control signal cannot however be converted into a service-brake brake signal, for example owing to an electrical defect in another electrical component of the respective service brake circuit.

The inverter control pressure is generated here by an inverter control valve and output via an inverter output and/or, given a corresponding switching-valve switched position, via a redundancy output of the inverter control valve, wherein an inverter control pressure is generated which is inversely proportional to a parking-brake brake pressure and/or parking brake control pressure which can be implemented in the parking brake circuit of the brake system, which are each to be applied in order to implement a specific braking specification via spring-loaded brakes which are arranged in the parking brake circuit. The braking specification which can be implemented via the spring-loaded brakes in the parking brake circuit can therefore also be transmitted or diverted to the service brake circuit or circuits via the inverter control valve, in order to compensate an electrical failure in the service brake circuit by means of a braking operation which is brought about redundantly in that case, unless the driver is already intervening manually and this manual intervention is specified to the respective service brake circuit via the switching valve.

Here, the braking specification to the parking brake circuit can be, for example, an assistance braking specification which is specified by an assistance control module in an automated fashion and/or a parking-brake braking specification which is specified manually via a parking-brake activation device or via a parking brake valve, and/or under certain circumstances also the service-brake braking specification which is specified manually via the service brake valve, which braking specifications can also be specified in this way in a redundant fashion via the inverter control valve to the service brakes in the respective service brake circuit for implementation. The assistance control module is provided in this case for controlling the vehicle in an automated fashion on the basis of surroundings information, wherein the vehicle can be braked in an automated fashion on the basis of the assistance braking specification, and the assistance braking specification can for this purpose be implemented both by the at least one service brake circuit and via the parking brake circuit.

In the event of an electrical failure of the at least one service brake circuit or else of the parking brake circuit, there can be provision within the scope of redundant braking that the respective braking specifications to the respective still functioning brake circuits or control modules thereof are applied in order to compensate for the electrical failure. This can be ensured by corresponding networking of the respective components e.g. via a random vehicle-internal (bus) network or CAN bus or via a direct connection of the individual components. Accordingly, in principle, all the abovementioned braking specifications can serve as redundant braking specifications in each of the brake circuits.

In order to be able to bring about application of the respective pressures in the respective brake circuits there is provision that the at least one service brake circuit is supplied with energy by a first energy source, and the parking brake circuit and—if needed—the inverter control valve are supplied with energy by a second energy source, wherein the first energy source is independent of the second energy source. This is intended to ensure that in the event of a failure of the first energy source for the service brake circuit in the parking brake circuit it will continue to be possible to apply pressures and these pressures will continue to be able to be inverted by the inverter control valve, in order to be able to specify the inverter control pressure to the failed service brake circuit or circuits.

According to a first alternative, the parking brake circuit in the brake system can have a parking-brake control module which generates the parking-brake brake pressure as a function of the respective braking specification, wherein in this alternative the braking specification is electrically transmitted to the parking-brake control module. The parking brake control module is connected to the spring-loaded brakes of the parking brake circuit, in order to transmit the parking-brake brake pressure pneumatically to the spring-loaded brakes. That is to say an electrically controlled parking brake is present.

In order to apply the braking specifications specified to the parking brake circuit, to the at least one service brake circuit via the inverter control valve, in particular in the event of an electrical failure of one of the service brake circuits, the parking-brake control module is also connected to the inverter control valve, in order to transmit the parking-brake brake pressure or a pressure dependent thereon, for example an internally generated control pressure, pneumatically to the inverter control valve and to ensure that inversion occurs therein. The inversion which is brought about in the inverter control valve preferably occurs via an inverse relay valve which is arranged in the inverter control valve.

The inversion which is brought about in the inverter control valve preferably takes place via an inverse relay valve which is arranged in the inverter control valve.

Inversion is understood within the scope of the invention to mean that the inverter control valve or the inverse relay valve ensure that an inverter control pressure which is inversely proportional to the parking-brake brake pressure and/or to a parking-brake control pressure is generated and output. As a result, it can advantageously be ensured that a parking-brake brake pressure which can be generated in the parking brake circuit in order to actuate the spring-loaded brakes and/or parking brake control pressure, which each characterize the braking specification which is specified to the parking brake circuit, can be used after the inversion to actuate the service brakes and to convert the braking specification in the at least one service brake circuit via said service brakes. That is to say via the service brakes in the service brake circuit, approximately the same braking effect is achieved as a function of the inverted parking-brake brake pressure and/or the inverted parking-brake brake pressure as via the spring-loaded brakes in the parking brake circuit as a function of the parking-brake brake pressure and/or the parking-brake control pressure. Therefore, in the event of an electrical failure in the service brake circuits it is possible to dispense with costly pressure control means for generating the service-brake brake pressure.

The inverter control valve can additionally ensure scaling here, i.e. the braking effect at the service brakes can be scaled, i.e. increased or reduced, by a factor with respect to the braking effect at the spring-loaded brakes, for example in order to improve the driving stability of the vehicle during braking. Furthermore, there can be provision that the inverter control pressure is specified to only one service brake circuit, in particular to a front-axle service brake circuit or else to further service brake circuits in the vehicle if an electrical failure has occurred and the failure is to be compensated by braking at further vehicle axles with service brakes. The embodiment variants which are described below are to be correspondingly provided in an identical fashion on just one vehicle axle or, if appropriate, also on further vehicle axles or in further service brake circuits.

According to one advantageous embodiment the inverter control valve can be embodied as a trailer control valve to which the parking-brake brake pressure which is generated in the parking brake circuit on the basis of the braking specification and/or parking-brake control pressure can be fed and which inverts this parking-brake brake pressure and/or parking-brake control pressure via an integrated inverse relay valve. Through recourse to a trailer control valve, which is already present in many utility vehicles and via which a trailer control pressure which is inverse with respect to the parking-brake brake pressure and/or parking-brake control pressure can be generated and applied to a brake system in a possibly coupled trailer, in order to actuate service brakes therein, there can be a saving in costs since the inversion function of the trailer control valve for generating the trailer control pressure can simultaneously also be used to generate the inverter control pressure and therefore to specify the service-brake brake pressure in the failed service brake circuit. As a result, the space requirement and the expenditure on open-loop and closed-loop control in the brake system can be minimized, since it is not necessary to install and actuate additional components in the vehicle. All that is necessary to ensure is that in the event of an electrical failure the inverter control pressure can be input into the corresponding service brake circuit.

According to an alternative embodiment, the pneumatic parking brake is provided, wherein for this purpose a parking brake valve is arranged in the parking brake circuit, which parking brake valve can be activated manually by the driver in order to request the parking-brake braking specification. The parking brake valve outputs, as a function of the parking-brake braking specification a parking-brake control pressure which is increased in air volume in a relay valve and subsequently output as a parking-brake brake pressure to the spring-loaded brakes, in order to implement the parking-brake braking specification. The parking-brake control pressure which is output by the parking brake valve or the parking-brake brake pressure which is output by the relay value or a pressure which is dependent thereon is transmitted to the inverter control valve via a pressure line, and is inverted therein via the inverse relay valve, in order to specify the inverter control pressure.

Therefore, in two alternatives, a parking-brake braking specification can be transmitted via a pneumatic parking brake or a parking-brake braking specification and/or an assistance braking specification and/or also a service-brake braking specification can be transmitted to the inverter control valve via an electric parking brake in the parking brake circuit. In the case of an electrical failure of the at least one service brake circuit, it is therefore possible to have recourse to the parking brake circuit which is present in the vehicle, in order to receive via the latter a braking specification in the form of a manual parking-brake braking specification and/or service-brake braking specification and/or the assistance braking specification which is requested in an automated fashion, and to divert it via the inverter control valve to the service brakes and therefore to actuate the latter redundantly, if the driver does not intervene manually in the braking operation within the scope of the first fallback level and the switching valve is for this purpose already placed in the corresponding switching-valve switched position.

According to a further alternative, the parking brake control module can also be integrated into the inverter control valve, and the assistance braking specification and/or the parking-brake braking specification and/or the service-brake specification can be transmitted electrically to the inverter control valve, e.g. via a (bus) network or a direct connection. The parking-brake brake pressure can be generated in the inverter control valve via the parking-brake control module on the basis of the assistance braking specification and/or the parking-brake braking specification, and said parking-brake brake pressure can be transmitted to the spring-loaded brakes via a parking-brake output on the inverter control valve, if braking via the spring-loaded brakes is desired.

The inverter control pressure can be generated on the basis of the assistance braking specification and/or the parking-brake brake specification and/or the service-brake brake specification in an electrically controlled fashion and output to the inverter output of the inverter control valve via an inverter control module which is integrated into the inverter control valve, can also be a component of the parking brake control module and contains a pilot control module with electrically controllable pressure valves, wherein the parking-brake brake pressure which is generated in the parking-brake control module is inversely proportional to the inverter control pressure generated by the pilot control module. The inverter control pressure thus generated is then also used redundantly to actuate the service brakes.

So that, in the case of an electrical failure of the service brake circuits, the inverter control pressure which is output via the inverter control valve via the inverter output can be applied to the service brakes and so that said inverter control pressure can therefore be fed into the respective service brake circuit, a redundancy pressure line which starts from the inverter output leads to the service brake circuits as follows.

Firstly, in the at least one service brake circuit in each case a pressure modulator is provided which is designed to output a pressure-modulator output pressure via a pressure modulator output as a function of the service-brake control signal, wherein the pressure-modulator output pressure can be transmitted as a service-brake brake pressure to the service brakes in order to implement a requested braking specification. This is the case during normal operation, i.e. without electrical failure in the service brake circuits, of the brake system.

Furthermore, the pressure modulator has a pneumatic redundancy port, wherein either the inverter control pressure or a service-brake control pressure which is output pneumatically by the service brake valve, on the basis of the service-brake braking specification, can be specified to the pneumatic redundancy port as a function of the switching-valve switched position as a redundancy pressure. The feeding of the inverter control pressure into the service brake circuit therefore takes place via the pneumatic redundancy port on the respective pressure modulator.

The pressure modulator is in this case preferably designed, if specification of the service-brake brake pressure as a function of the service-brake control signal which can be output by the service-brake control module is not possible, i.e. electrical failure has occurred in the respective service brake circuit, to generate the pressure-modulator output pressure as a function of the service-brake control pressure which is optionally fed to the redundancy port or of the inverter control pressure. As a result, it is easily possible to form two fallback levels in which redundant braking can be specified and implemented manually or in an automated fashion via the parking brake circuit or manually directly via the service brake valve. For this purpose, in an existing brake system with a pneumatically redundant and electrically actuatable pressure modulator, advantageously only one additional switching valve has to be provided for this purpose.

Through the upstream switching valve, it is therefore possible to ensure, in particular in the case of electrical failure of the at least one service brake circuit and subsequently induced redundant braking, that the driver can intervene redundantly in the braking by correspondingly switching the switching valve if the driver is in place or attentive, and also intervenes in a pneumatically redundant fashion himself via the service-brake valve. When a service-brake braking specification is present, an inverter control pressure which is also possibly redundantly specified on the basis of the braking specification in the parking brake circuit can be ended in a controlled fashion by the driver before the first switching-valve switched position is set, in order to subsequently implement the driver's request.

The optional specification of the redundancy pressure preferably takes place, therefore, in accordance with the invention via the switching valve which is connected upstream of the redundancy port, wherein, in the first switching-valve switched position, the switching valve connects the service brake valve to the redundancy port in order to specify the service-brake control pressure as a redundancy pressure, and in the second switching-valve switched position the switching valve outputs the inverter control pressure to the redundancy port of the pressure modulator in order to specify the inverter control pressure as a redundancy pressure.

In order to achieve this, two alternative embodiments of the switching valve are possible. According to a first embodiment, the switching valve is arranged in the at least one service brake circuit, wherein the switching valve is preferably arranged on a vehicle axle which is assigned to the at least one service brake circuit, and in the first switching-valve switched position the switching valve connects the service brake valve to the redundancy port in order to redundantly specify the service-brake control pressure to the redundancy port, and in the second switching-valve switched position the switching valve connects the inverter output of the inverter control valve to the redundancy port in order to redundantly specify the inverter control pressure to the redundancy port. The switching valve is therefore connected upstream of the redundancy port directly on the vehicle axle.

Accordingly, the service brake valve can preferably be connected in a pressure-conducting fashion to a first switching valve input of the switching valve, and the inverter output can be connected in a pressure-conducting fashion to a second switching valve input of the switching valve, and a switching valve output of the switching valve can be connected in a pressure-conducting fashion to the redundancy port of the pressure modulator. In the first switching-valve switched position, the first switching valve input is then connected to the switching valve output, and in the second switching-valve switched position the second switching valve input is connected to the switching valve output, in order to be able to bring about corresponding application.

In one alternative embodiment, the switching valve is integrated as an inverter switching valve into the inverter control valve. The specification of the redundancy pressure to the redundancy port then takes place by virtue of the fact that in the first switching-valve switched position the service brake valve is connected to an additional redundancy output of the inverter control valve, and in the second switching-valve switched position the inverter control pressure which is generated in the inverter control valve is output to the redundancy output, wherein the redundancy output of the inverter control valve is connected to the redundancy port of the pressure modulator.

For this purpose, the service brake valve is preferably connected in a pressure-conducting fashion to a first inverter switching-valve input of the inverter switching valve, for example via a corresponding inverter input in the inverter control valve, and the inverter control pressure generated in the inverter control valve is fed to the second inverter switching-valve input of the inverter switching valve. An inverter switching-valve output of the inverter switching valve is connected in a pressure-conducting fashion to the redundancy output of the inverter control valve, and the redundancy output is connected in a pressure-conducting fashion to the redundancy port of the pressure modulator. In the first switching-valve switched position, the first switching-valve input is connected in a pressure-conducting fashion to the inverter switching-valve output, and in the second switching-valve switched position the second inverter switching-valve input is connected in a pressure-conducting fashion to the inverter switching-valve output, in order to be able to bring about corresponding application.

Therefore, in two alternative arrangements of the switching valve it is possible for switching according to the invention to take place between the driver's request and the inverter control pressure, wherein in the case of the solution which is integrated into the inverter control valve, improved retrofittability is provided, if the inverting function is not already present in the form of a trailer control valve in the vehicle. In that case, the switching function according to the invention can be retrofitted at the same time as the installation of the inverter control valve in the vehicle. In addition, there can be a saving in space on the vehicle axles, since installment of the switching valves on the vehicle axle can be dispensed with. In addition, just one switching valve is needed for both vehicle axles.

On the other hand, with the switching valves which are arranged on the vehicle axles it is possible to bring about different redundant actuation on each axle, and when there is a trailer control valve already present with an inversion function, the brake system can be upgraded in a modular fashion by retrofitting individual switching valves on the vehicle axles.

If there is provision in the integrated solution for the inverter control pressure to also be used as a trailer control operating pressure for outputting to a trailer, the inverter control pressure is to be output separately as a trailer control pressure via the inverter output ("yellow coupling head"). In this case, therefore in contrast to the other solution, the specifications to the trailer and the service brake circuit can be made via the same inverter output, which corresponds to the "yellow coupling head".

The switching valve used is advantageously embodied as a shuttle valve or an electrically or pneumatically controllable 3/2-way valve, wherein the shuttle valve is designed to adjust the switching valve switched positions, optionally as a function of the magnitude of the pressures present at the witching valve inputs of the respective switching valve and consequently preferably control the higher of the pressures present (select high valve). In order to be able to switch to the driver's request in a situation-dependent fashion in this case, it is necessary to ensure that the inverter control pressure which is also fed to the shuttle valve is reduced in a controlled fashion, i.e. redundant braking which has already been carried out is ended in a controlled fashion. As a result, when a service-brake braking specification which is pneumatically predefined via the service brake valve is present, the inverter control pressure is lower than the service-brake control pressure so that the shuttle valve which is embodied as a select high valve is moved automatically into the first switching-valve switched position.

The 3/2-way valve, however, can be actively moved into the first switching-valve switched position or into the second switching-valve switched position as a function of an, for example, electrically specified switching signal. In order also to be able to switch into the first switching-valve switched position in this case when a service-brake braking request which is specified pneumatically by the service brake valve is present, and therefore in order to implement said braking request, the switching signal can advantageously be generated as a function of whether a manually requested service-brake braking specification is present in the at least one service brake circuit.

For this purpose, as already described above, a pressure sensor can preferably be provided in the brake system, preferably integrated in the inverter control valve or on the service brake valve, wherein the pressure sensor is designed to measure the service-brake control pressure output by the service brake valve as a result of the service-brake brake specification, and to output a braking request signal as a function of said pressure, as a function of which braking request signal the switching signal can be generated. With this switching signal, the switching valve can be moved into the first switching-valve switched position in which the service-brake control pressure is specified to the redundancy port. Alternatively, a service-brake braking request can also occur electronically insofar as this information can be acquired and processed in the case of an electrical failure. According to a further alternative, the 3/2-way valve can also have a pneumatic control input to which e.g. the service-brake control pressure or a pressure which is proportional thereto is fed as a switching control pressure. The switching valve can then be switched into the corresponding switching-valve switched position on the basis of the switching control pressure at the pneumatic control input.

According to the preferred embodiment, provision is made for a shutoff valve to also be provided in the brake system, wherein in a first shutoff-valve switched position the shutoff valve connects a redundancy pressure line leading to the redundancy port of the pressure modulator to a bleeding port for bleeding the redundancy pressure line, and, in order to prevent application of the service-brake brake pressure to the service brake, in particular as a function of the inverter control pressure, and in a second shutoff-valve switched position the inverter control pressure generated in the inverter control valve can be transmitted via the redundancy pressure line in order to redundantly specify the service-brake brake pressure as a function of the inverter control pressure.

The additional shutoff valve is advantageous here for the desired shutoff function in particular when a shuttle valve is provided as the switching valve. However, if the switching valve is embodied as an electrically controllable 3/2-way valve, the shutoff valve can also be dispensed with and the shutoff function of the shutoff valve can instead also be ensured by the switching valve which is present in any case by virtue of the fact that said shutoff valve is moved by electrical actuation into the corresponding switching-valve switched position in which the service-brake brake pressure is not specified by the inverter control pressure but rather by the service-brake control pressure.

The shutoff valve can be integrated into the inverter control valve here, in order to simplify the retrofittability and to save space, or can be arranged downstream of the inverter output or of the redundancy output in the redundancy pressure line. The shutoff valve advantageously ensures that, for example in the stationary state of the vehicle, the redundant specification of the inverter control pressure is prevented, so that the service brakes are not permanently applied in the stationary state and therefore bleeding of the pressure medium reservoirs of the brake system in the case of a leak is avoided.

According to the invention it is accordingly possible in a method firstly to detect whether the service-brake brake pressure in the at least one service brake circuit is possible, as a function of a service-brake control signal which can be specified electrically, for implementing the respective braking specification of the service brakes, and accordingly the desired braking specification can be implemented under electrical control. If this is not the case, i.e. if, for example a defect is present in the service-brake control module and the latter correspondingly cannot output any service-brake control signals, the inverter control pressure is generated in the inverter control valve, as described above, by means of inversion, as a function of the braking specification specified to the parking brake circuit, and the service-brake brake pressure in the at least one service brake circuit is output, as described, as a function of the inverter control pressure. However, if at the same time a service-brake braking specification which is specified pneumatically via the service brake valve is present, the service-brake brake pressure is specified as a function of this service-brake braking specification in that the switching valve is moved into the corresponding switching-valve switched position immediately or after the aborting of a possibly previously executed braking operation, which switching-valve switched position prevents the service-brake braking pressure from being specified as a function of the inverter control pressure and permits it to be specified as a function of the service-brake braking specification.

FIG. 1 shows a schematic illustration of a vehicle 100 with a brake system 1, which can be braked in two service brake circuits 2a, 2b via service brakes 3 on the wheels 4. A front-axle service brake circuit 2a is assigned to a front axle 6a, and a rear-axle service brake circuit 2b assigned to a rear axle 6b. Further vehicle axles can also be provided, to which the vehicle axle service brake circuits 6a and 6b or further service brake circuits are assigned. In each case the pressure medium reservoir 5a, 5b is assigned on an axle basis to the service brake circuits 2a, 2b.

A parking brake circuit 7 is also assigned to the rear axle 6b, wherein the wheels 4 on the rear axle 6b can be braked in this parking brake circuit 7 via a spring-loaded brakes 8, so that the wheels 4 of the rear axle 6b can be decelerated both in the rear-axle service brake circuit 2b via the service brakes 3, and in the parking brake circuit 7 via the spring-loaded brakes 8. For this purpose, combined service/spring-loaded brakes are provided on the rear axle 6b. The parking brake circuit 7 is supplied with pressure medium by an independent parking-brake pressure medium reservoir 5c.

In order to activate the service brakes 3 and therefore to implement a requested braking specification which is characterized by a vehicle setpoint deceleration zSoll or a setpoint brake pressure, in each case a pressure modulator 9a, 9b is arranged in each of the two service brake circuits 2a, 2b on the respective vehicle axle 6a, 6b, wherein the two pressure modulators 9a, 9b according to this exemplary embodiment can be actuated electrically or pneumatically in order to apply a specific service-brake brake pressure pBa, pBb to the service brakes 3 of the respective vehicle axle 6a, 6b and therefore bring out application of the service brakes 3. Basically, the service-brake brake pressure pBa, pBb can be specified individually for each of the individual service brakes 3, for example within the scope of a traction control process which is carried out at the individual wheels 4 on the basis of the data from wheel speed sensors 4a. The traction control process can take place directly on the rear axle 6b by means of the rear-axle pressure modulator 9b, and on the front axle 6a via ABS control valves 3a which are connected upstream of the service brakes 3.

In the normal driving mode, the respective pressure modulators 9a, 9b are actuated electrically via service-brake control signals Sa, Sb, wherein the respective service-brake control signals Sa, Sb are generated in a service-brake control module 10, as a function of the respective braking specification or the vehicle setpoint deceleration zSoll, in such a way that the respective pressure modulator 9a, 9b applies to the service brakes 3 a service-brake brake pressure pBa, pBb with which the requested braking specification is implemented. The service-brake control signal Sa, Sb can be output here, for example via a CAN bus or some other network, an analogue or pulse-width-modulated control signal with which a pressure-modulator output pressure pDa, pDb is generated in a known fashion in the pressure modulator 9a, 9b via pressure valves, which pressure-modulator output pressure pDa, pDb is output as a service-brake brake pressure pBa, pBb via a pressure-modulator output 9a1, 9b1 to the respective service brake 3.

The pressure modulators 9a, 9b are therefore each electrically connected to the service-brake control module 10 which can electrically control the braking effect on an individual basis in the two service-brake brake circuits 2a, 2b, and in this context is embodied as a central control module which during normal operation is responsible for the electrical implementation of the braking specification in the two service-brake brake circuits 2a, 2b. The service-brake control module 10 and the respective pressure modulators 9a, 9b as well as further components of the respective service-brake brake circuits 2a, 2b are supplied with energy by a first energy source 11a according to this exemplary embodiment.

The vehicle setpoint deceleration zSoll can be defined manually here by the driver, who predefines a service-brake braking specification VB with a brake pedal, through manual activation of a service brake activation device 13, e.g. of an electropneumatic service brake valve, which service-brake braking specification VB is output to the service-brake control module 10 via a service-brake activation signal S1 and from which the vehicle setpoint deceleration zSoll follows. Furthermore, in the automated driving mode an assistance braking specification VA which is specified in an automated fashion can be output by an assistance control module 35 via an assistance control signal SAss, which assistance braking specification VA is also transmitted to the service-brake control module 10, for example via a CAN bus 20 or another networking vehicle 100, and also corresponds to a specific vehicle setpoint deceleration zSoll.

The assistance control module 35 is designed here to control the vehicle 100 in an automated fashion on the basis of information about the surroundings, in particular to brake it according to the assistance braking specification VA, and, as a function thereof, to output the assistance control signal SAss in particular to the brake system 1.

In order to continue to ensure implementation of the service-brake braking specification VB or of the assistance braking specification VA, i.e. of the vehicle setpoint deceleration zSoll in the event of an electrical failure, a plurality of fallback levels can be switched to. In this context, the fallback levels ensure that the electrically controllable brake system 1 is suitable for a certain degree of automation within the scope of an electronically controlled autonomous driving mode. The fallback levels are configured as follows:

In a first fallback level, when an electrical failure is detected in one of the components of the two service brake circuits 2a, 2b, pneumatic redundancy ports 12a, 12b are automatically activated in the respective pressure modulator 9a, 9b. These cause the respective pressure modulator 9a, 9b to be no longer able to be actuated electrically via the service-brake control signals Sa, Sb, rather only pneumatically as a function of a specified redundancy pressure pRa, pRb which is present at the respective pneumatic redundancy port 12a, 12b. The specification of the respective redundancy pressure pRa, pRb is carried out differently per axle according to FIG. 1.

Accordingly, in the rear-axle service brake circuit 2b a rear-axle service-brake control pressure pSb, which is applied by the service-brake valve 13 is output as a rear-axle redundancy pressure pRb, to the pneumatic rear-axle redundancy port 12b via a pneumatic line. The service brake valve 13 applies the rear-axle service-brake control pressure pSb here as a function of the service-brake braking specification VB which is specified manually by the driver, so that the same braking is requested pneumatically by means of the rear-axle service-brake control pressure pSb as via the rear-axle service-brake control signal Sb.

In the front-axle service brake circuit 2a it is possible to specify as a front-axle redundancy pressure pRa, e.g. a front-axle service-brake control pressure pSa which is also applied by the service-brake brake valve 13 according to the service-brake braking specification VB, wherein said front-axle service-brake control pressure pSa is, in contrast to the rear-axle service brake circuit 2b, not output directly to the front-axle pressure modulator 9a or the pneumatic front-axle redundancy port 12a thereof. Instead, a front-axle switching valve 14a is arranged upstream of the pneumatic front-axle redundancy port 12a, which front-axle switching valve 14a can be switched into two switching-valve switched positions X1, X2. For the sake of clarity, the reference symbols which are used below for the components of the front-axle switching valve 14a are not illustrated in FIG. 1. Instead, reference is made to the view of the detail in FIGS. 2a and 2b.

The front-axle switching valve 14a has a first front-axle switching valve input 14a1, a second front-axle switching valve input 14a2 and a front-axle switching-valve output 14a3, wherein the front-axle switching-valve output 14a3 is connected to the pneumatic front-axle redundancy port 12a on the front-axle pressure modulator 9a and the first front-axle switching-valve input 14a1 is connected to the service brake valve 13. If the front-axle switching valve 14a is in its first switching-valve switched position X1, the front-axle service-brake control pressure pSa which is specified by the service brake valve 13 and is present at the first front-axle switching-valve input 14a1 is passed through to the pneumatic front-axle redundancy port 12a, so that in this first switching-valve switched position X1 the pneumatically specified service-brake braking specification VB of the driver is implemented by the front-axle pressure modulator 9a in that the front-axle service-brake control pressure pSa is output with an increased air quantity to the service brakes 3 of the front axle 6a.

The service-brake braking specification VB which is specified by the driver by means of the electropneumatic service brake valve 13, i.e. a specific specified vehicle setpoint deceleration zSoll, can therefore be implemented by the respective pressure modulator 9a, 9b during normal operation as a function of the service-brake control signals Sa, Sb which are output electronically by the service-brake control module 10 or in the first fallback level as a function of the service-brake control pressures pSa, pSb which are modulated directly in a pneumatic fashion by the service-brake valve 13.

The second front-axle switching valve input 14a2 of the front-axle switching valve 14a is connected to an inverter control valve 15 via a redundancy pressure line 21. As a result, in the second switching-valve switched position X2 of the front-axle switching valve 14a an inverter control pressure pI, which is output from an inverter output 16 of the inverter valve 15, can be passed through as a front-axle redundancy pressure pRa to the pneumatic front-axle redundancy port 12a of the front-axle pressure modulator 9a. As a result, the service brakes 3 on the front axle 6 can be additionally supplied with a front-axle brake pressure pBa which is dependent on the inverter control pressure pI. This permits a second fallback level to be formed as follows:

The specification of the inverter control pressure pI by the inverter control valve 15 can take place basically as a function of different paths: According to FIG. 1, e.g. the front-axle service-brake control pressure pSa, which is applied directly by the service brake valve 13 as a function of the service-brake braking specification VB, can be fed to the inverter control valve 15 via a first inverter input 17a via a pressure line. In the inverter control valve 15, said front-axle service-brake control pressure pSa is output, having been increased in terms of air quantity and subsequently as an inverter control pressure pI, to the inverter output 16, wherein the increasing of the air quantity takes place with the pressure medium from the parking-brake pressure medium reservoir 5c, which pressure medium is also fed to the inverter control valve 15. The inverter control pressure pI which is generated in the inverter control valve 15 can be output to a possibly coupled trailer 200 via the inverter output 16 as a trailer control pressure pT in order also to brake said trailer 200 as a function of the service-brake braking specification VB by the driver.

Furthermore, electrical specification of the service-brake braking specification VB to the inverter control valve 15 can take place via a second inverter input 17b, wherein the electrical braking specification according to this embodiment takes place via a first inverter control signal ST1 which is output by the service-brake control module 10 and is formed as a function of the vehicle setpoint deceleration zSoll. The first inverter control signal ST1 is transmitted directly to a pilot control module 29 in the inverter control valve 15 via the second inverter input 17b and actuates said valve as a function of the first inverter control signal ST1 in such a way that, by opening and closing pressure valves in the pilot control module 29 with the pressure medium from the parking-brake pressure medium reservoir 5c, a pressure which corresponds to the service-brake braking specification VB is generated, said pressure being output as an inverter control pressure pl at the inverter output 16. Therefore, a service-brake braking specification VB which is processed electrically via the service-brake control module 10 can also be transferred to a possibly coupled trailer 200 via the inverter control valve 15.

A third inverter input 17c on the inverter control valve 15 is connected via a pressure line to a parking-brake control module 18 which generates, in the parking brake circuit 7, a parking-brake brake pressure pPH, for example as a function of a parking-brake braking specification VP which is specified manually by the driver via a parking-brake activation device 19, and outputs this parking-brake brake pressure, or a control pressure, which is generated internally in the parking-brake control module 18 and as a function of which the parking-brake brake pressure pPH is generated, to the spring-loaded brakes 8, so that a certain braking effect can be achieved on the rear axle 6b via the spring-loaded brakes 8. For this purpose, according to FIG. 1, when a parking-brake braking specification VP is present, the parking-brake activation device 19 outputs, in an electronic fashion, a parking-brake activation signal S2 to the parking brake control module 18. Within the scope of this parking braking process, just one complete opening process or application process of the spring-loaded brakes 8 is provided here. For example, such a parking-brake control module 18 is described in DE 10 2015 008 377 A1, the content of which is hereby included in its entirety through reference.

Furthermore, the assistance braking specification VA which is specified in an automated fashion can also be transmitted via the CAN bus 20 or the assistance control signal SAss to the parking brake control module 18 and also be implemented by the latter, for example within the scope of a braking function which is specified in an automated fashion or an emergency braking function which is specified in an automated fashion or a parking brake function which is specified in an automated fashion. For this purpose, the parking-brake brake pressure pPH is generated by the parking-brake control module 18 as a function of this assistance braking specification VP which is specified in an automated fashion, and said parking-brake brake pressure pPH applied to the spring-loaded brakes 8, in order also to be able to bring about an assisting braking process during travel, or to bring about parking via the parking brake circuit 7 and the spring-loaded brakes 8 in the stationary state. Within the scope of the above a graduated braking process is also possible in the parking brake circuit 7.

The parking-brake brake pressure pPH which is supplied to the inverter control valve 15 via the third inverter input 17c, or a pressure which is dependent on said parking-brake brake pressure pPH—is inverted in the inverter control valve 15 via an inverse relay valve 26 (illustrated only schematically in FIG. 1) and output as an inverter control pressure pl to the inverter output 16. The inversion of the parking-brake brake pressure pPH is provided here in order to be able to use the inverter control pressure pl to actuate even service brakes which are applied at high service-brake brake pressures pBa, pBb and open at low service-brake brake pressures pBa, pBb. In contrast, the parking-brake brake pressure pPH is output taking into account the fact that the spring-loaded brakes 8 in the parking brake circuit 7 are applied at low parking-brake brake pressures pPH and open at high parking-brake brake pressures pPH.

Such an inversion function via an inverse relay valve 26 in the inverter control valve 15 is already present in conventional trailer control valves 15a which are provided for braking a trailer 200, coupled to the vehicle 100, with service brakes via a parking-brake brake pressure pPH which is applied in the parking brake circuit 7, and accordingly also for braking a targeted fashion the trailer 200 according to the parking-brake braking specification VP or the assistance braking specification VA in a parking situation, an auxiliary braking situation or an emergency braking situation. The inverter output 16 accordingly corresponds to the "yellow coupling head" of a conventional trailer control valve 15a. An additional supply pressure output 16V on the trailer control valve 15a serves here to transmit the pressure medium from the parking-brake pressure medium reservoir 5c to the trailer 200, wherein the reservoir pressure output 16V corresponds to the "red coupling head" of a conventional trailer control valve 15a. Accordingly, the inverter control valve 15 can advantageously also be embodied as a conventional trailer control valve 15a.

The parking brake control module 18 is connected to a second energy source 11b which is independent of the first energy source 11a, so that the service brake circuits 2a, 2b and the parking brake circuit 7 are operated energetically independently of one another. In the event of a failure of the first energy source 11a, at least the assistance braking specification VA and the parking-brake braking specification VP can therefore be specified and applied via the parking brake circuit 7 and the inverter control valve 15. The independence of the energy sources 11a, 11b can be ensured here either by virtue of the fact that energy sources 11a, 11b which are separate from one another are used or else galvanic isolation occurs between the energy sources 11a, 11b.

However, in the event of a failure of the first energy source 11 a or of the electrical components of the service brake circuits 2a, 2b, i.e. in the event of it being no longer possible to apply a service-brake brake pressure pBa, pBb according to the electrical specification Sa, Sb or by means of the service-brake control module 10 and by means of the pressure modulators 9a, 9b, the described structure of the electronic brake system 1 according to FIG. 1 also permits implementation of the service-brake braking specification VB as follows, in order to compensate for the failure of the service brake circuits 2a, 2b:

As already described, in the first fallback level a service-brake braking specification VB which is specified by the driver pneumatically via the service brake valve 13 can be specified, through corresponding switching of the front-axle switching valve 14a into the first switching-valve switched position X1, to the pneumatic front-axle redundancy port 12a of the front-axle pressure modulator 9a and furthermore also directly to the pneumatic rear-axle redundancy port 12b of the rear-axle pressure modulator 9b. Therefore, in the event of an electrical failure the service-brake braking specification VB specified by the driver can still be brought about redundantly via the service brakes 3 on both vehicle axles 6a, 6b.

In a second fallback level, which intervenes if the driver is not available when there is an electrical failure of the service brake circuits 2a, 2b, since said driver is e.g. inattentive, or is not in place when there are relatively highly automated driving maneuvers, the assistance braking specification VA which is specified in an automated fashion can also be implemented by the service brakes 3 on at least one vehicle axle 6a, 6b. This case can occur, for example, when the vehicle 100 is travelling under automated control, in which case the assistance braking specification VA is specified, for example in the form of the vehicle setpoint deceleration, by the assistance control module 35 via the CAN bus 20.

The automated engagement occurs then by virtue of the fact that when an electrical failure is detected, for example in the first energy source 11*a* or the service-brake control module 10 or the pressure modulators 9*a*, 9*b*, the assistance braking specification VA which is specified in an automated fashion and is to be brought about via the service brake circuits 2*a*, 2*b* is processed by the parking-brake control module 18 instead of by the service-brake control module 10. That is to say the assistance braking specification VA which is transmitted via the assistance control signal SAss or the vehicle setpoint deceleration zSoll is no longer processed, as during normal operation, by the service-brake control module 10 and implemented via the latter by the service brakes 3 in the service brake circuits 2*a*, 2*b*. The electrical failure can be detected here, for example, within the scope of self-diagnostics by the service-brake control module 10, and can be signaled in a corresponding way to the parking-brake control module 18, e.g. via a diagnostics signal SD or a corresponding message on the CAN bus 20.

The parking-brake control module 18 generates the parking-brake brake pressure pPH as a function of the assistance control signal SAss or the specified vehicle setpoint deceleration zSoll and specifies said parking-brake brake pressure pPH to the inverter control valve 15 via the third inverter input 17*c*. Furthermore, the spring-loaded brakes 8 are also supplied with this parking-brake brake pressure pPH so that in the case of redundancy the rear axle 6*b* is braked as a function of the automated assistance braking specification VA. In the inverter control valve 15, the parking-brake brake pressure pPH is output after having been inverted via the inverse relay valve 26 and, if appropriate, increased in terms of air quantity, via the inverter output 16 as an inverter control pressure pI. The inverter control pressure pI is fed via the redundancy pressure line 21 to the second front-axle switching valve input 14*a*2 of the front-axle switching valve 14*a* and as a trailer control pressure pT to a possibly coupled trailer 200. In the second switching-valve switched position X2 of the front-axle switching valve 14*a*, the inverter control pressure pI can therefore be fed as a front-axle redundancy pressure pRa to the pneumatic front-axle redundancy port 12, and via the latter the assistance braking specification VA which is specified in an automated fashion can be effected redundantly on the front axle 6*a* via the service brakes 3, even without the presence of a driver's request. The inversion in the inverter control valve 15 via the inverse relay valve 26 is also necessary for this, since, in contrast to the parking brake circuit 7, service brakes 3 are actuated in the front-axle service brake circuit 2*a*.

Therefore, in the second fallback level the implementation of an assistance braking specification VA, specified in an automated fashion, on both vehicle axles 6*a*, 6*b* is also possible, wherein the front axle 6*a* is braked via the service brakes 3, and the rear axle 6*b* via the spring-loaded brakes 8. In this second fallback level, the parking-brake control module 18 performs here the implementation of the braking which is specified in an automated fashion, wherein the parking-brake brake pressure pPH which follows from the assistance braking specification VA is diverted to the front axle 6*a* via the inverter control valve 15.

In order to be able to have recourse to the two described fallback levels, corresponding switching of the front-axle switching valve 14*a* is necessary. According to FIGS. 2*a* and 2*b*, the front-axle switching valve 14*a* can be embodied for this purpose as a shuttle valve 40*a* (FIG. 2*a*) or as a 3/2-way valve 40*b* (FIG. 2*b*). The two valves 40*a*, 40*b* each have two front-axle switching valve inputs 14*a*1, 14*a*2 as well as a front-axle switching valve output 14*a*3 which, as described, are made to extend in a pressure-conducting fashion to the corresponding components of the front-axle brake circuit 2*a* of the brake system 1. The method of functioning of the illustrated valves 40*a*, 40*b* differs as follows:

The shuttle valve 40*a*, also referred to as "select high valve" passes on the respective higher pressure of the pressures present at the two front-axle switching-valve inputs 14*a*1, 14*a*2 to the front-axle switching-valve output 14*a*3. In the embodiment according to FIG. 1, therefore either the front-axle service-brake control pressure pSa which is output by the service brake valve 13 or the inverter control pressure pI which is output by the inverter control valve 15 is conducted as front-axle redundancy pressure pRa to the pneumatic front-axle redundancy port 12*a* of the front-axle pressure modulator 9*a* depending on which of the two pressures pSa, pI is higher.

If a manually specified service-brake braking specification VB by the driver via the service brake valve 13 is present and if this service-brake braking specification VB gives rise to a higher applied pressure value for the front-axle service-brake control pressure pSa than the parking-brake brake pressure pPH which is applied by the parking-brake control module 18 and which is applied on the basis of an assistant braking specification VA which is requested in an automated fashion via the assistance control signal SAss and is conducted as an inverter control signal pI to the shuttle valve 40*a*, the shuttle valve 40*a* is switched automatically into the first switching-valve switched position X1, and the manually specified service-brake braking specification VB is implemented on the front axle 6*a* via the service brakes 3. However, if the driver is attentive or not in place or does not intervene manually in the braking and if automatic braking is requested via the assistance control signal SAss, the front-axle service-brake control pressure pSa is accordingly always lower than the parking-brake brake pressure pPH or the inverter control pressure pI, so that the shuttle valve 40*a* goes automatically into the second switching-valve switched position X2, and the assistance braking specification VA which is specified in an automated fashion is implemented via the service brakes 3 on the front axle 3.

According to FIG. 2*b*, the front-axle switching valve 14*a* is embodied as a 3/2-way valve 40*b* which can be moved into the respective switching-valve switched position X1, X2 under electrical control via a switching signal SU, and therefore either the first front-axle switching valve input 14*a*1 (X1) or the second front-axle switching valve input 14*a*2 (X2) is connected to the front-axle switching-valve output 14*a*3. The switching-signal SU can be generated and output, for example, by the parking-brake control module 18, in order to specify the switching-valve switched position X1, X2 electrically.

Figure 2A:
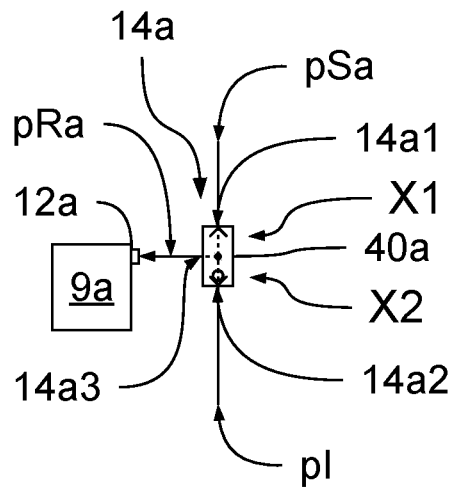
FIGS. 2*a, b, c, d, e* show various embodiments of switching valves in a brake system according to FIG. 1.
Figure 2B:
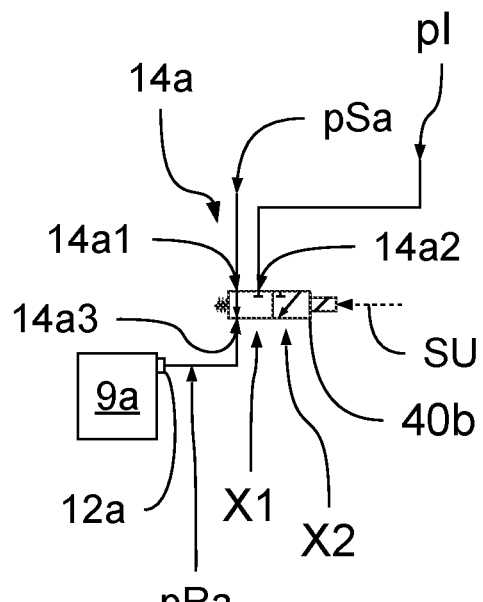
Figure 2C:
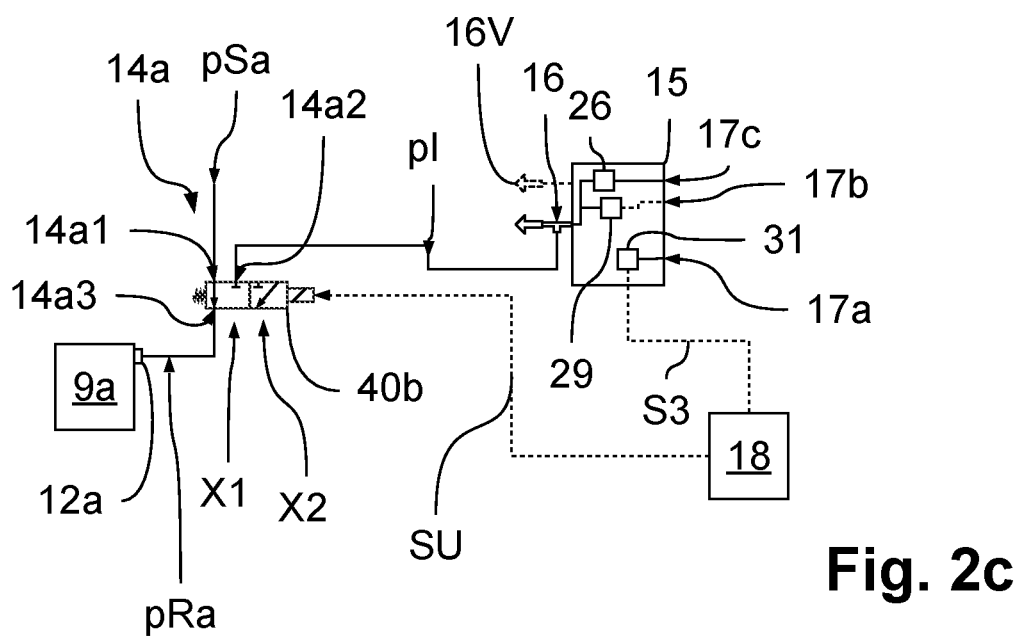

According to one embodiment which is illustrated in FIG. 2*c*, there can be provision to arrange e.g. in the inverter control valve 15—if appropriate also directly on the service brake valve 13—a pressure sensor 31 which measures the front-axle service-brake control pressure pSa specified to the first inverter input 17*a*, and accordingly detects whether a service-brake braking specification VB by the driver is present. The pressure sensor 31 outputs a braking request signal S3, for example, to the parking-brake control module 18 for processing, and the parking-brake control module 18 subsequently outputs a corresponding switching signal SU which switches the 3/2-way valve 40*b* into the first switching position X1 if a service-brake braking specification VB which is present is signaled via the braking request signal S3, so that the service-brake braking specification VB which is pneumatically specified by the service brake valve 13 is conducted from the 3/2-way valve 40b to the front-axle redundancy port 12a, and is converted by the front-axle pressure modulator 9a into a corresponding front-axle service-brake brake pressure pBa.

With the switching valves 40a, 40b which are disclosed in FIGS. 2a, 2b, 2c it is therefore possible to specify in an automated or actively controlled fashion in the brake system 1 according to FIG. 1 which front-axle redundancy pressure pRa is present at the pneumatic front-axle redundancy port 12a and accordingly which redundant braking is to be implemented on the front axle 6a via the service brakes 3: the service-brake braking specification VB or the assistance braking specification VA which is specified in an automated fashion.

The shuttle valve 40a here has the advantage that in any situation the driver can automatically override the assistance braking specification VA which is specified in an automated fashion via the inverter control valve 15, so that the service-brake braking specification VB, i.e. a braking process which is requested by the driver, can always be given a higher priority in comparison with a braking process which is requested in an automated fashion if the driver requests stronger braking. This higher priority can also be allocated an actively controlled 3/2-way valve 40b in the exemplary embodiments illustrated in FIG. 2c in that, when a driver braking process is present and is sensed e.g. via the pressure sensor 31, switching over into the first switching-valve switched position X1 takes place via the switching signal SU. However, such switching with the 3/2-way valve 40b occurs only if particularly stronger braking is not already implemented at the respective time in the second switching-valve switched position X2. In order to avoid bringing about an unsafe driving state or some other kind of dangerous situation as a result of the switching, the other braking process is firstly ended in an uncontrolled fashion, and only then is switching over into the first switching-valve switched position X1 carried out.

Figure 2E:
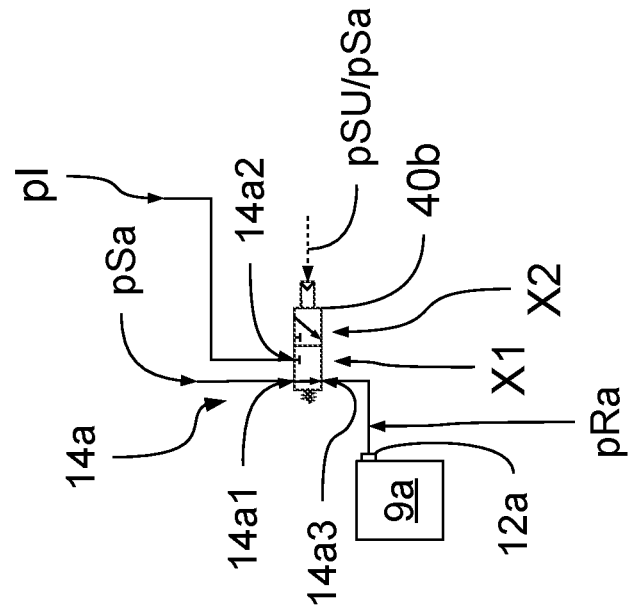
Figure 2D:
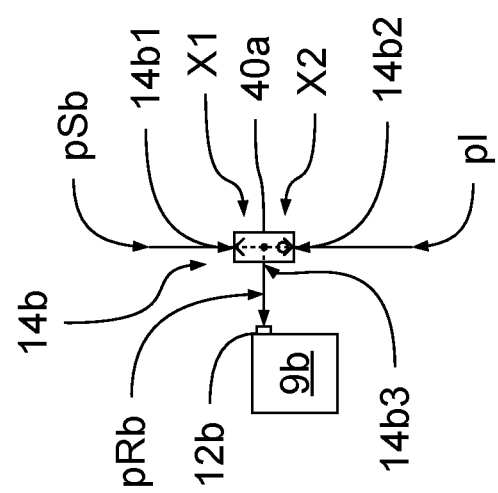

Such a switching valve 40a, 40b—as is illustrated in FIG. 2d as representative of the shuttle valve 40a—can basically also be arranged upstream on the rear axle 6b or on the pneumatic rear-axle redundancy port 12b, in order also to detect the rear-axle redundancy pressure pRb as a function of the driver's request VB or according to the assistance braking specification VA if an electrical failure occurs. Accordingly, a rear-axle switching valve 14b is provided with a first rear-axle switching-valve input 14b1 and a second rear-axle switching-valve input 14b2 which, depending on the switching-valve switched position X1, X2, conduct the rear-axle service-brake control pressure pSb or the inverter control pressure pl to a rear-axle switching-valve output 14b3.

The structural configuration in the electrically controlled brake system 1 is in this case comparable with an arrangement on the front axle 6a, so that the redundant actuation via the rear-axle switching valve 14b can take place in an analogous fashion. When a rear-axle switching valve 14b is used, all that has to be ensured is that in the respective fallback levels the spring-loaded brakes 8 are not applied by the parking-brake control module 18 at the same time as the service brakes 3 on the rear axle 6b, in order to avoid bringing about a superimposed braking effect on the rear axle 6b as a result of the simultaneous activation of the two brakes 3, 8 on the rear axle 6b. This can be done, for example by means of a corresponding open-loop and closed-loop control process in the parking-brake control module 18 in that, for example, outputting of the parking-brake brake pressure pPH to the spring-loaded brakes 8 is prevented if an electrical failure has occurred in the service brake circuits 2a, 2b and redundant actuation of the service brakes 3 on the rear axle 6b is to take place via the inverter control valve 15.

According to FIG. 2e, a pneumatically controllable 3/2-way valve 40b is illustrated by way of example as a front-axle switching valve 14a. A switching control pressure pSU can be fed to said 3/2-way valve 40b pneumatically, said switching control pressure pSU being provided by means of the front-axle service-brake control pressure pSa or a pressure which is proportional thereto. The first switching-valve switched position X1 can be set as a function of the level of the switching control pressure pSU to output the driver's request as a redundant braking request to the respective service brake circuit 2a, 2b.

Figure 3:
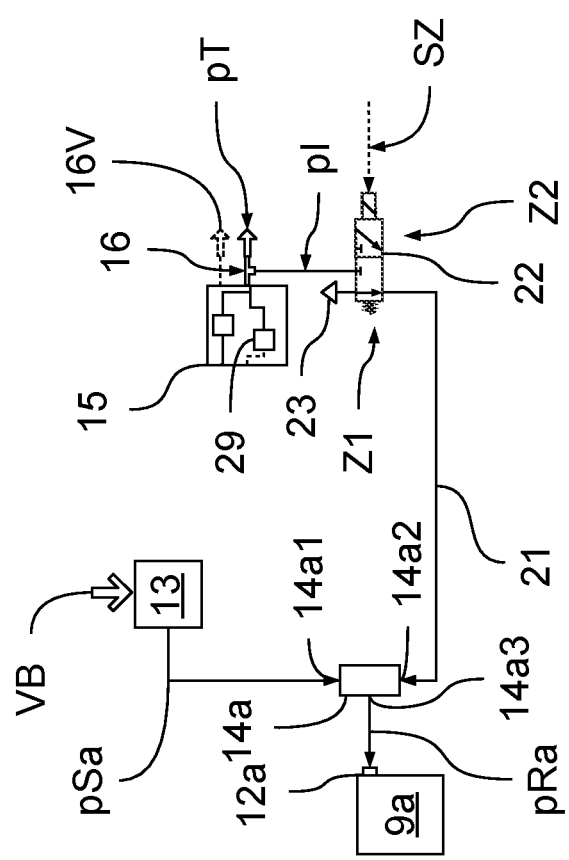
FIG. 3 shows the brake system according to FIG. 1 with a shutoff valve for implementing a shutoff function.

According to FIG. 3, a further embodiment of the brake system 1 is illustrated, wherein in addition a shutoff valve 22 is provided which is arranged in the redundancy pressure line 21 between the inverter control valve 15 or the inverter output 16 and the front-axle switching valve 14a. For the sake of clarity, only the relevant part of the brake system 1 is illustrated in order to clarify the function of the additional shutoff valve 22. All the further components of the brake system 1 are identical to the embodiment shown in FIG. 1.

The shutoff valve 22 is embodied as an electrically controllable 3/2-way valve which can be switched between two shutoff valve switched positions Z1, Z2 as a function of a shutoff signal SZ. In a first shutoff valve switched position Z1 the redundancy pressure line 21 is connected to a bleeding portion 23, so that the inverter control pressure pl is not transmitted from the inverter control valve 15 to the front-axle switching valve 14a. The second front-axle switching-valve input 14a2 is accordingly pressureless. When the front-axle switching valve 14a is switched into the second switching-valve switched position X2, the service brakes 3 on the front axle 6a therefore also remain pressureless and are therefore not applied. Redundant implementation of an assistance braking specification VA, which is specified in an automated fashion, via the service brakes 3 of the front axle 6a in the second fallback level is therefore not possible when the first shutoff-valve switched position Z1 has been set.

In a second shutoff-valve switched position Z2 of the shutoff valve 22, the redundancy pressure line 21 is connected in a pressure-conducting fashion to the inverter output 16, so that, as in the brake system 1 according to FIG. 1, redundant operation according to the above description can take place in that the inverter control pressure pl is also conducted according to the assistance braking specification VA to the front-axle switching valve 14a in the second fallback level.

The respective shutoff-valve switched position Z1, Z2 is specified here by the parking-brake control module 18 via the shutoff signal SZ so that it can be specified whether and when there is to be redundant intervention in the second fallback level. The shutoff function can be advantageous, for example, when the vehicle 100 is shut down for a relatively long time period and accordingly it is not absolutely necessary to brake the vehicle 100 via the front axle 6a, since the vehicle 100 is already kept in a stationary state via the spring-loaded brakes 8 and, if appropriate, the trailer 200. By switching into the first shutoff-valve switched position Z1 in such a situation it is possible, for example to prevent a situation in which, when there are possible leaks in the service brakes 3, the pressure medium can escape if said service brakes 3 are continuously applied with a service-brake brake pressure pBa, pBb in the stationary state.

If the switching valve 14a in FIG. 3 is embodied as a 3/2-way valve 40b, the shutoff function can also already be implemented by means of the switching valve 14a in that in the stationary state or when the vehicle is shutdown for a lengthy time the first switching-valve switched position X1, which corresponds in this case to the first shutoff-valve switched position Z1, is set. Unless there is a driver activation, the first switching valve input 14a1 will accordingly be bled via the service brake valve 13, which corresponds in FIG. 3 to the connection of the redundancy pressure line 21 to the bleeding portion 23. Therefore, in such an embodiment the shutoff function can take place only with the 3/2-way valve 40b as a switching valve 14a unless there is an additional valve.

Figure 4:
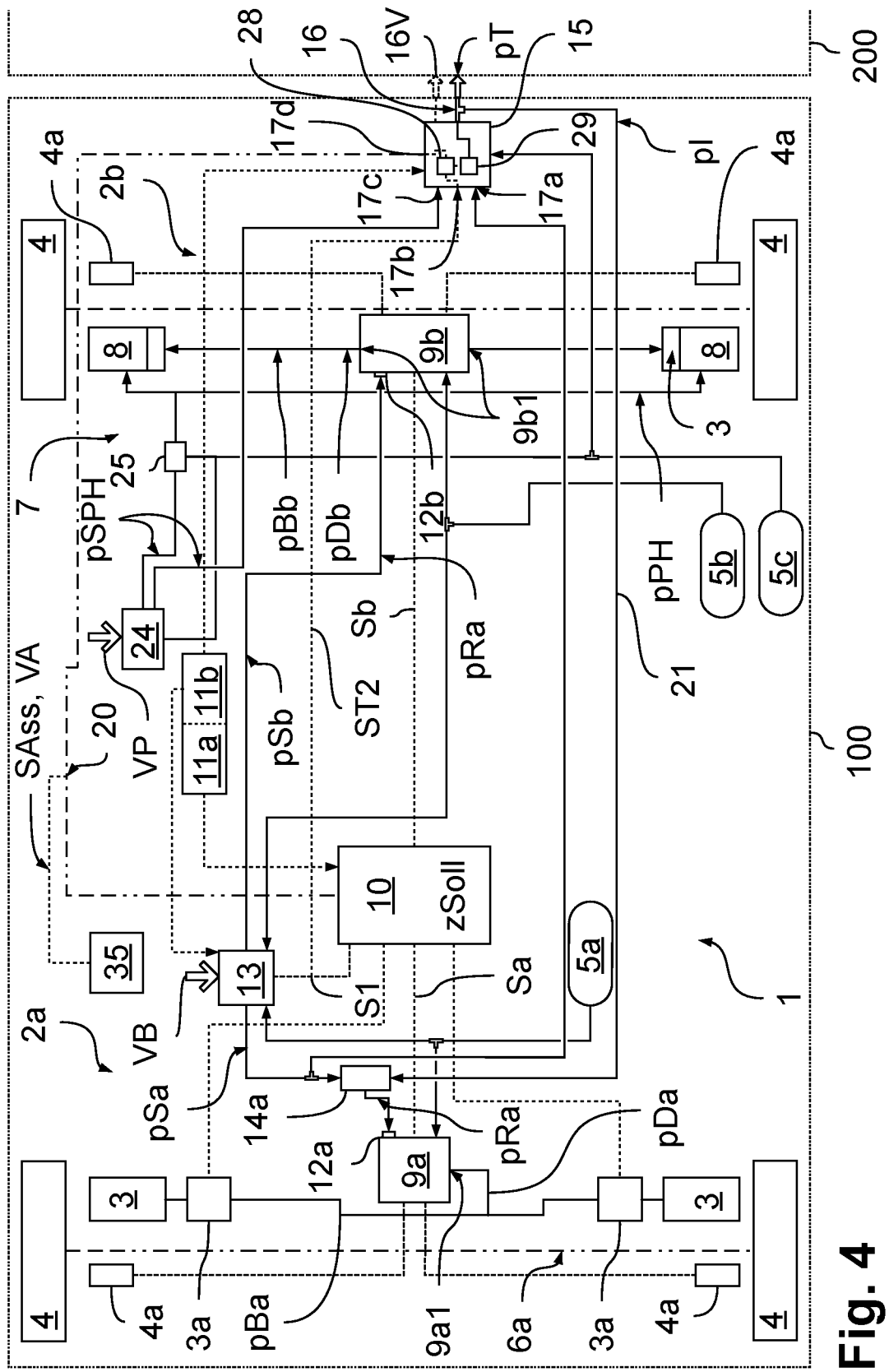
FIG. 4 shows an electronically controllable brake system with a pneumatic controllable parking brake.

According to FIG. 4, a further embodiment of the electronically controllable brake system 1 is illustrated, wherein this embodiment differs from the brake system 1 according to FIG. 1 by virtue of the fact that the parking brake circuit 7 is not formed by an electrically controlled parking brake but rather by a pneumatically controlled parking brake. Accordingly, in this embodiment there is no provision of a parking-brake control module 18 which specifies the parking-brake brake pressure pPH to the inverter control valve 15 and to the spring-loaded brakes 8. In order to be able to bring about a braking operation in this parking brake circuit 7, the driver has to manually specify a parking-brake braking specification VP via a parking brake valve 24 which applies a parking-brake control pressure pSPH, corresponding to the parking-brake braking specification VP, to a relay valve 25. The relay valve 25 ensures that the quantity of air is increased and outputs this parking-brake control pressure pSPH with an increased quantity of air, as a parking-brake brake pressure pPH, to the spring-loaded brakes 8, in order to bring about corresponding braking at the latter.

The parking-brake control pressure pSPH which is output by the parking brake valve 24 or a pressure which is dependent thereon is additionally transmitted to the third inverter input 17c of the inverter valve 15, inverted in the inverter control valve 15 by the inverse relay valve 26 and applied to the second front-axle switching-valve input 14a2 of the front-axle switching valve 14a via the inverter output 16, so that, as in the previous exemplary embodiment, the corresponding front-axle redundancy pressure pRa is output at the front-axle switching-valve output 14a3 to the front-axle redundancy port 12a depending on the switching-valve switched position X1, X2. Accordingly, the driver can intervene manually in the braking process via the parking brake valve 24, if at least one of the service brake circuits 2a, 2b has failed.

If the service-brake control module 10 has failed, the assistance braking specification VA which is requested in an automated fashion can be implemented in the brake system 1 according to FIG. 4 only via the inverter control valve 15 in that the assistance braking specification VA is transmitted from the CAN bus 20 to said brake system 1 and in this case converted into an inverter control pressure pI via corresponding electronics integrated in the inverter control valve 15 (cf. FIG. 6 or 7c), e.g. an inverter control module 28, and the pilot control module 29 in parallel with the inversion described in FIG. 1. The service-brake braking specification VB which is specified via the service brake valve 13 can be implemented in the event of an electronic failure, in that, for example, the service-brake braking specification VB is transmitted from the service brake valve 13 to the second inverter input 17b via a second inverter control signal ST2, for example via a (bus) network or a direct connection or the like, in order to generate the corresponding inverter control pressure pl via the electronics integrated in the inverter control valve 15 (cf. FIG. 6 or 7c), e.g. the inverter control module 28, and the pilot control module 29 in a way analogous to the assistance braking specification VA. The transmission of the first inverter control signal ST1 to the second inverter input 17b is eliminated in this case. In order to permit this even in the case of an electrical failure of the service brake circuits 2a, 2b and, if appropriate, also of the first energy source 11a, the service brake 13 and also the inverter control valve 15 are to be supplied with energy redundantly, e.g. via the second energy source 11b.

In all the described embodiments it is therefore ensured that in the event of an electrical failure in at least one of the service brake circuits 2a, 2b, i.e. in the event of the pressure modulators 9a, 9b not being able to apply a corresponding service-brake brake pressure pBa, pBb under electrical control by the service-brake control module 10, at least one fallback level is formed in which the service brakes 3 on the front axle 6a and/or on the rear axle 6b are actuated as a function of a parking-brake braking specification VP which is present in the parking brake circuit 7 and is specified manually, or of an assistance braking specification VA which is specified in an automated fashion. If appropriate, a service-brake braking specification VB which is electrically output by the electropneumatic service brake valve 13 can also be present at the parking brake circuit 7. The parking-brake brake pressure pPH which corresponds to the respective braking specification VA, VB, VP and is applied in the parking brake circuit 7 (FIG. 1) or the parking-brake control pressure pSPH (FIG. 4) is inverted via the inverter control valve 15 and diverted to the front axle 6a or rear axle 6b, wherein the inversion ensures that if necessary a braking operation via the service brakes 3 brings about approximately the same braking effect as a braking operation with the spring-loaded brakes 8 according to the specified braking specification VA, VB, VP.

Under certain circumstances it may also be appropriate to scale the braking specification VA, VB, VP on an axle basis, i.e. the parking-brake brake pressure pPH is smaller or larger by a factor than the service-brake brake pressure pBa, pBb which is generated as a function thereof.

The inverter control pressure pl which is made available by the inverter control valve 15 is output in all exemplary embodiments to the respective vehicle axles 6a, 6b via the respective switching valve 14a, 14b, in order to permit switching between two fallback levels, and therefore to provide the driver with the possibility in a situation-conditioned fashion of intervening in a braking fashion via the service brake valve 13, wherein, if appropriate, a braking process which has already been carried out in an automated fashion is ended beforehand in a controlled fashion, in order to avoid bringing about unstable driving states.

Figure 5:
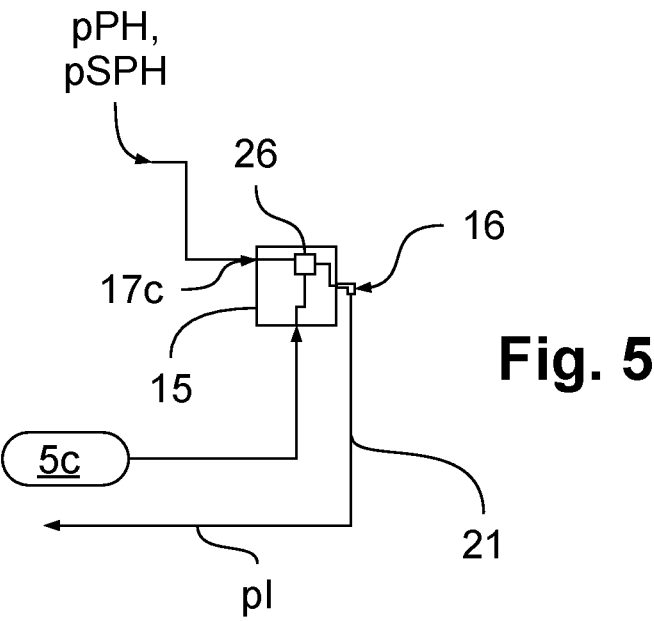
FIGS. 5 and 6 show inverter control valves in different embodiments, FIGS. 7*a, b, c* show inverter control valves with an integrated switching valve in different embodiments.

In the previous embodiments, the inverter control valve 15 is embodied essentially like a trailer control valve 15a with the corresponding inverter inputs 17a, 17b, 17c and the inverter output 16 which corresponds to the "yellow coupling head", and the supply pressure output 16V, which corresponds to the "red coupling head". However, according to FIG. 5 there can also be provision in the simplest variant that the inverter control valve 15 is composed of only one inverse relay valve 26, to which the parking-brake brake pressure pPH or the parking-brake control pressure pSPH is fed, as described above, via the third inverter input 17c. The inverse relay valve 26 inverts the parking-brake brake pressure pPH or the parking-brake control pressure pSPH correspondingly and outputs the inverter controller pressure pI to the redundancy pressure line 21 via the inverter output 16. The first and the second inverter input 17b, 17c can be eliminated in this exemplary embodiment.

Therefore, in this simplest variant of a known trailer control valve 15a, only the inversion function is transferred into the inverter control valve 15, which is sufficient, for example, when only one redundant braking operation is to take place with the inverter control valve 15, and there is no provision for a trailer 200 to be actuated via said inverter control valve 15. Optionally, further functionalities which make up the redundant braking mode can gradually be implemented via an additional control module.

Figure 6:
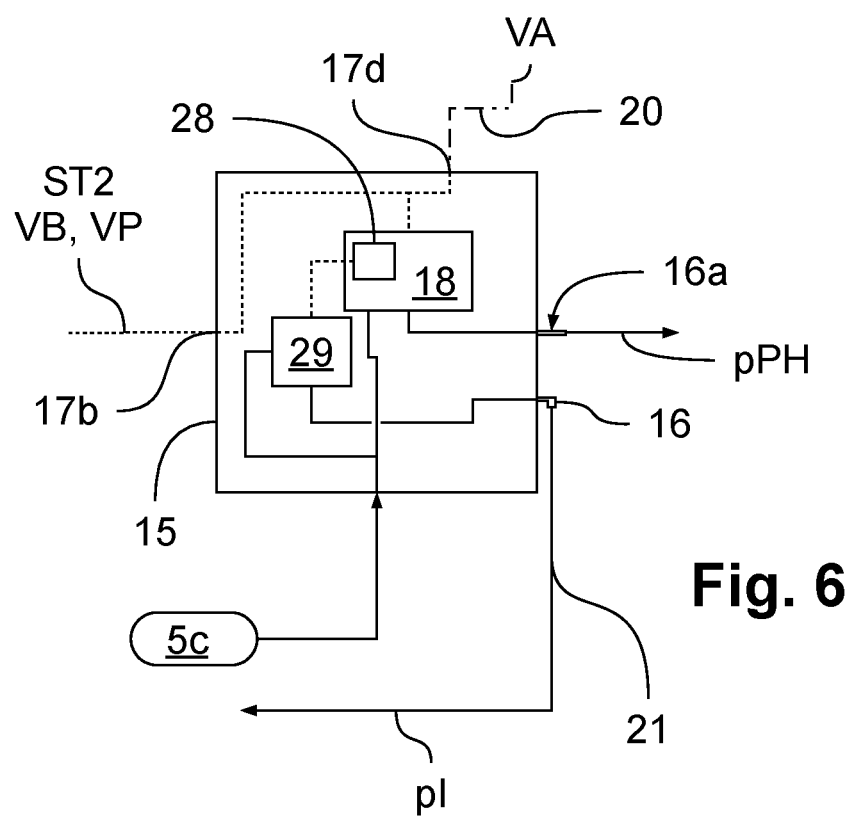

In a purely electrically controlled variant of the inverter control valve 15 which is illustrated in FIG. 6 there can be provision for the inverter control pressure pI to be generated in a purely electronic fashion, i.e. for the inversion to be carried out electronically. For this purpose, the parking brake control module 18 is arranged in the inverter control valve 15, and the parking-brake braking specification VP or the parking-brake activation signal S2 and/or the service-brake braking specification VB or the service-brake activation signal S1 is fed to the inverter control valve 15 via the second inverter input 17b or an additional inverter input, via the second inverter control signal ST2 which is transmitted via a (bus) network which differs from the CAN bus 20 or via a direct connection from the service brake valve 13 or by the parking-brake activation device 19. Furthermore, the assistance braking specification VA or the assistance control signal SAss which is transmitted in the vehicle 100 via the CAN bus 20 can be fed via a fourth inverter input 17d. The parking-brake control module 18 generates the parking-brake brake pressure pPH as a function of one of these braking specifications VA, VB, VP and outputs said parking-brake brake pressure pPH and to the spring-loaded brakes 8 via an additional parking-brake output 16a on the inverter control valve 15, in order to be able to bring about a braking operation in the parking brake circuit 7. The pilot control module 29 in the inverter control valve 15 generates, under control by the inverter control module 28 integrated into the parking-braking control module 18, an inverter control pressure pI, which is inverse with respect to the parking-brake brake pressure pPH, as a function of the respective braking specification VA, VB, VP, which inverter control pressure pI is output to the respective switching valve 14a, 14b on the vehicle axles 6a, 6b via the output 16 in order to implement the braking process for with the service brakes 3.

Figure 7A:
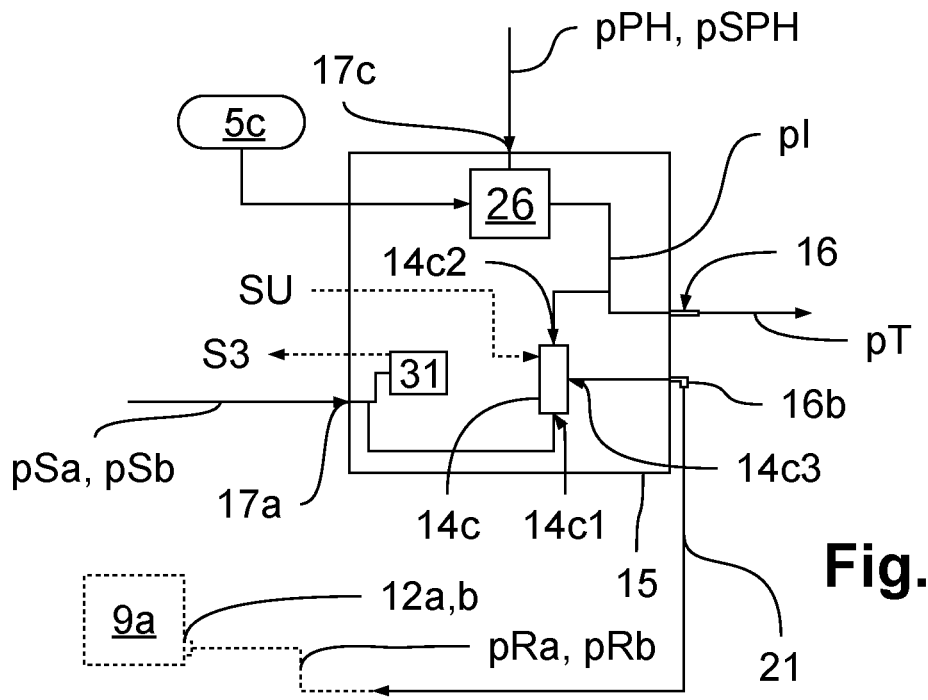
Figure 7B:
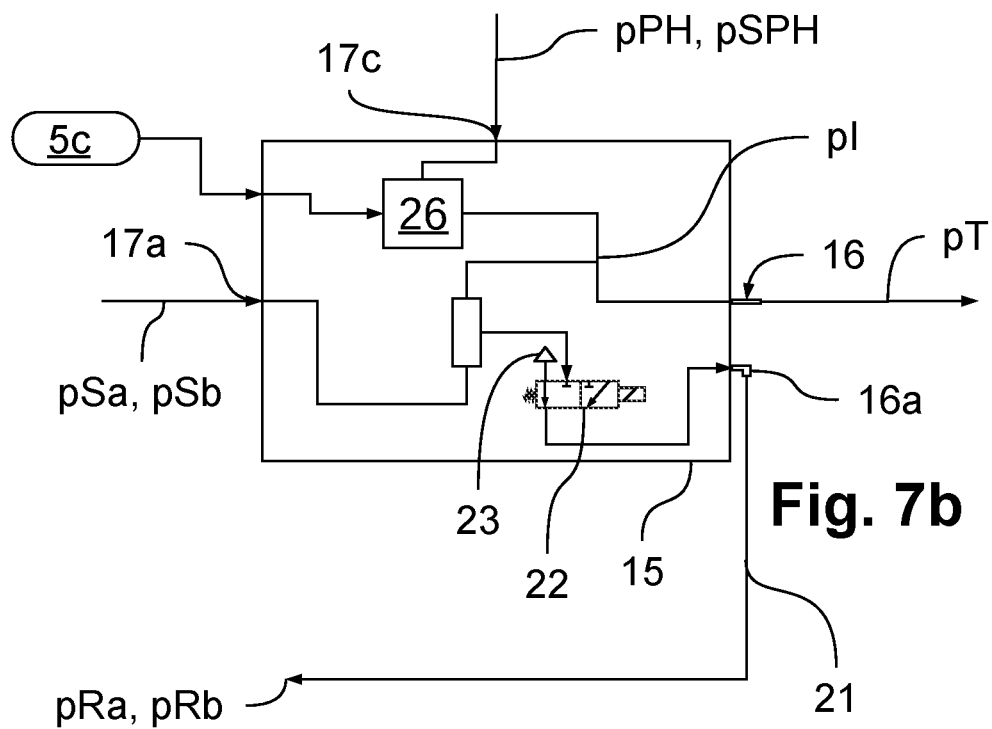
Figure 7C:
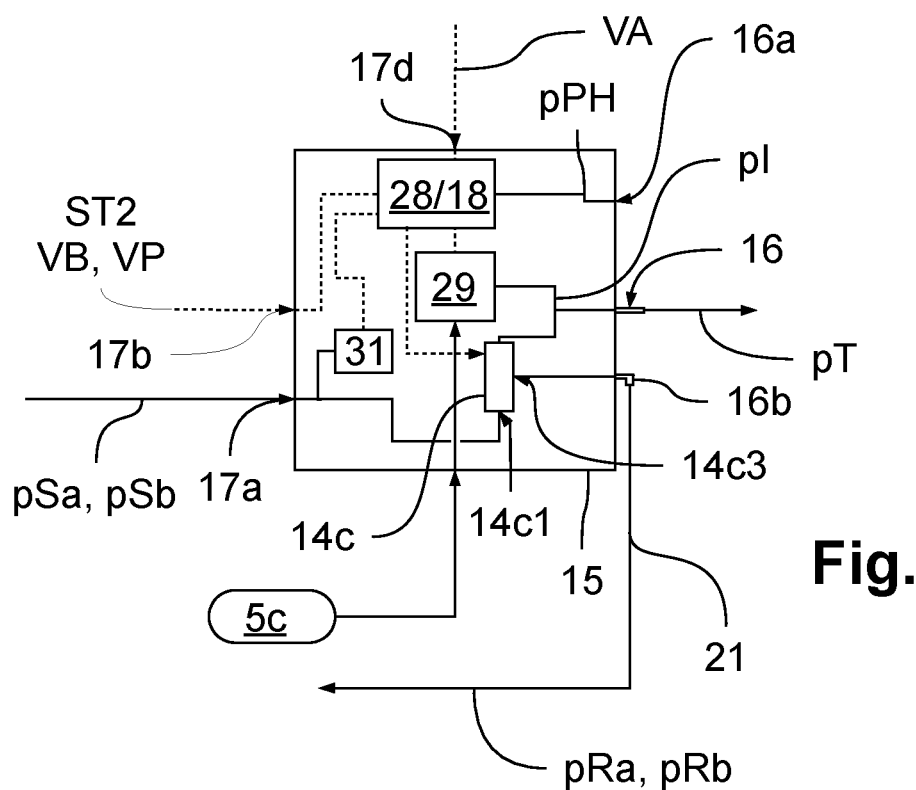

According to further embodiments of the inverter control valve 15 which are illustrated in FIGS. 7a, 7b and 7c, an inverter switching valve 14c is integrated in the inverter control valve 15, wherein the inverter switching valve 14c performs the same task and functionality as the switching valves 14a, 14b, specified in the preceding exemplary embodiments, on the respective vehicle axle 6a, 6b. The inverter switching valve 14c can be embodied here, as also in the preceding embodiments, as a shuttle valve 40a (see FIG. 2a) or as an electrically controllable 3/2-way valve 40b (see FIGS. 2b and 2c). For the sake of clarity, only the components in the inverter control valve 15 which differ from the previous embodiments are illustrated in FIGS. 7a to 7c.

According to FIG. 7a, there is accordingly provision to specify, to the inverter switching valve 14c via a first inverter switching-valve input 14c1, the service-brake control pressure pSa, pSb which is applied by the service brake valve 13 on the basis of the service-brake braking specification VB, said service-brake control pressure pSa, pSb being preferably the front-axle service-brake control pressure pSa which, as in the brake system 1 according to FIG. 1 or 4, is transmitted to the inverter control valve 15 via the first inverter input 17a, in order to brake the trailer 200 as a function of the front-axle service-brake control pressure pSa.

The inverter control pressure pI which is generated by the inverse relay valve 26 in the inverter control valve 15 from the parking-brake pressure medium reservoir 5c is specified to a second inverter switching-valve input 14c2 of the inverter switching valve 14c. The inverse relay valve 26 generates the inverter control pressure pI according to this embodiment as a function of the parking-brake brake pressure pPH which is present at the third inverter input 17c (FIG. 1) or parking-brake control pressure pSPH (FIG. 4) by inversion, as described already with respect to the other exemplary embodiments. The generated inverter control pressure pI is subsequently transmitted to the second inverter switching-valve input 14c2 as well as also to the inverter output 16—i.e. the "yellow coupling head" of a trailer control valve 15a—in order to be able to specify the latter as a trailer control pressure pT to a brake system with service brakes in the coupled trailer 200.

Depending on the switching-valve switched position X1, X2, the pressures pI, pSa, pSb which are present at the inverter switching-valve inputs 14c1, 14c2, are optionally output to an inverter switching-valve output 14c3 of the inverter switching valve 14c according to the system described above, i.e. in an automated fashion via the shuttle valve 40a or under active control via the 3/2-way valve 40b. The inverter switching-valve output 14c3 is connected to a redundancy output 16b of the inverter control valve 15, in order to be able to output the pressure pI, pSa, pSb, optionally output by the inverter switching-valve output 14c3, for the actuation of the service brakes 3 via the pressure modulator 9a, 9b.

In this embodiment of the inverter control valve 15, for this purpose the redundancy pressure line 21 is connected to the redundancy output 16b, in order to ensure that the pressure pI, pSa, pSb, pDa, pDb which is optionally output is fed via the latter into the at least one service brake circuit 2a, 2b. To this end, the redundancy pressure line 21 is connected directly to the redundancy port 12a, 12b of the respective pressure modulator 9a, 9b, in order to use as the redundancy pressure pRa, pRb the pressure which is output at the redundancy output 16b of the inverter control valve 15—i.e. either the inverter control pressure pI or the service-brake control pressure pSa, pSb. Only the front-axle pressure modulator 9a is illustrated in FIG. 7a by way of example.

Depending on whether only one of the vehicle axles 6a, 6b is to be redundantly braked via the corresponding service brake circuit 2a, 2b as a function of the inverter control pressure pI in the redundant braking mode, the redundancy pressure line 21 can only ensure that the inverter control pressure pI is fed into one of the service brake circuits 2a, 2b. The service brake circuit 2a, 2b or the respective other service brake circuits 2a, 2b can then not be braked redundantly by means of the braking specification, derived from the inverter control valve 15.

The respective switching-valve switched position X1, X2 of the inverter switching valve 14c is set, depending on the design, automatically in the case of a shuttle valve 40a or actively controlled via the switching signal SU in the case of the 3/2-way valve 40b, as has already been described with respect to the previous embodiments. The switching signal SU can advantageously occur, as indicated in FIG. 7a, as a function of the measurement of the pressure sensor 31, as also in the exemplary embodiment according to FIG. 2c.

That is to say, for example, in the parking-brake control module 18 it is evaluated on the basis of the braking request signal S3 whether a manually specified service-brake braking specification VB is present, and on the basis thereof the inverter switching valve 14c which is embodied in this case as a 3/2-way valve 40b, is actuated and switched into the corresponding switching-valve switched position X1, X2.

If a service-brake braking specification VB is accordingly generated by the driver via the service brake valve 13 and if an electrical failure has occurred in the service brake circuits 2a, 2b, the service-brake control pressure pSa, pSb is present at the first inverter input 17a, which can be measured by the pressure sensor 31. Subsequently, the inverter switching valve 14c is actively switched into the first switching-valve switched position X1 via the switching valve SU, so that the service-brake control pressure pSa, pSb can be output, as a redundancy pressure pRa, pRb, to the respective redundancy port 12a, 12b of the respective pressure modulator 9a, 9b in accordance with the service-brake braking specification VB. As a result, it is possible to have recourse to the first fallback level according to the above description. A braking process VA which has possibly been requested beforehand in an automated fashion in the second fallback level via the parking-brake brake circuit 7, i.e. in the second switching-valve switched position X2, is accordingly aborted in a controlled fashion.

According to FIG. 7b, in addition to the inverter switching valve 14c the shutoff valve 22 is also integrated into the inverter control valve 15, in order to be able to implement, according to the embodiment in FIG. 3, a shutoff function which is of identical design according to this embodiment and defines, as a function of the shutoff valve switched position Z1, Z2, whether or not in the second switching-valve switched position X2 the inverter control pressure pI—and here also the service-brake control pressure pSa, pSb in the first switching-valve switch position X1—are transmitted to the respective service brake circuit 2a, 2b via the redundancy pressure line 21. In the case of a service-brake braking specification VB which is specified manually by the driver, there is preferably provision here on a standard basis for the second shutoff-valve switched position Z2 to be set to be able to implement the driver's braking request in any case via the service brake circuits 2a, 2b, irrespective of an electrical failure in the service brake circuits 2a, 2b. If the inverter switching valve 14c is embodied as a 3/2-way valve 40b, the shutoff function, as has already been described above with respect to FIG. 3, can also be brought about by means of the inverter switching valve 14c instead of via the shutoff valve 22 by means of corresponding actuation.

The structural refinements of the inverter control valve 15 according to FIGS. 7a and 7b therefore ensure that it is no longer necessary to position switching valves 14a, 14b or a shutoff valve 22 on the respective axles 6a, 6b, but rather an integrated compact solution can be installed in the vehicle 100. As a result, simple retrofittability and low space requirement on the vehicle axle 6a, 6b can be achieved, since the relevant components are located essentially in the inverter control valve 15 and can therefore easily be subsequently installed in one working step, e.g. instead of a conventional trailer control valve 15a. Accordingly, only the redundancy pressure line 21 has to be newly laid to the inverter control valve 15.

According to FIG. 7c, it is possible to provide, in a way comparable with the embodiment in FIG. 6, for the corresponding braking specification VA, VB, VP to be transmitted electrically to the inverter control valve 15. For this purpose, the assistance braking specification VA which is specified in an automated fashion is transmitted from the CAN bus 20 (fourth inverter input 17d) or the service-brake/parking-brake braking specification VB, VP via a direct connection or a further (bus) network (second inverter input 17b) via the second inverter control signal ST2 to the inverter control valve 15. In the inverter control valve 15, the inverter control pressure pI is generated from the respective braking specification VA, VB, VP via the pilot control module 29 under control by the inverter control module 28 and is output to the second inverter switching-valve input 14c2 of the inverter switching valve 14c. Alternatively or additionally it is possible, as also described with respect to FIG. 6, for the parking-brake control module 18 to be integrated, together with the inverter control module 28, into the inverter control valve 15, and then with a corresponding parking brake output 16a for outputting the parking-brake brake pressure pPH which is generated therein. The generation of the inverter control pressure pI, which is inversely proportional to a parking-brake brake pressure pPH which can be implemented in the parking brake circuit 7 on the basis of the respective braking specification VA, VB, VP, or parking-brake control pressure pSPH, is therefore also achieved again here by means of electronic actuation of the pilot control module 29. In this context the pressure sensor 31 is particularly preferably integrated into the inverter control valve 15, in order to detect the driver's request and switch the inverter switching valve 14c correspondingly in a situation-dependent fashion via the inverter control module 28, integrated into the inverter control valve 15, or parking-brake control module 18.

In addition, it is also possible to arrange an inverse relay valve 26 (not illustrated) in the inverter control valve 15 according to FIG. 7c, in order when necessary to be able to invert the parking-brake control pressure pSPH, specified via the third inverter input 17c (likewise not illustrated), or parking-brake brake pressure pPH, as described with respect to the previous examples, so that further redundancy can be formed. This is the case if the parking-brake control module 18 is not integrated into the inverter control module 15 or a pneumatic parking brake according to FIG. 4 is provided, and accordingly, inversion which is controlled in a non-electrical fashion is required.

Figure 8:
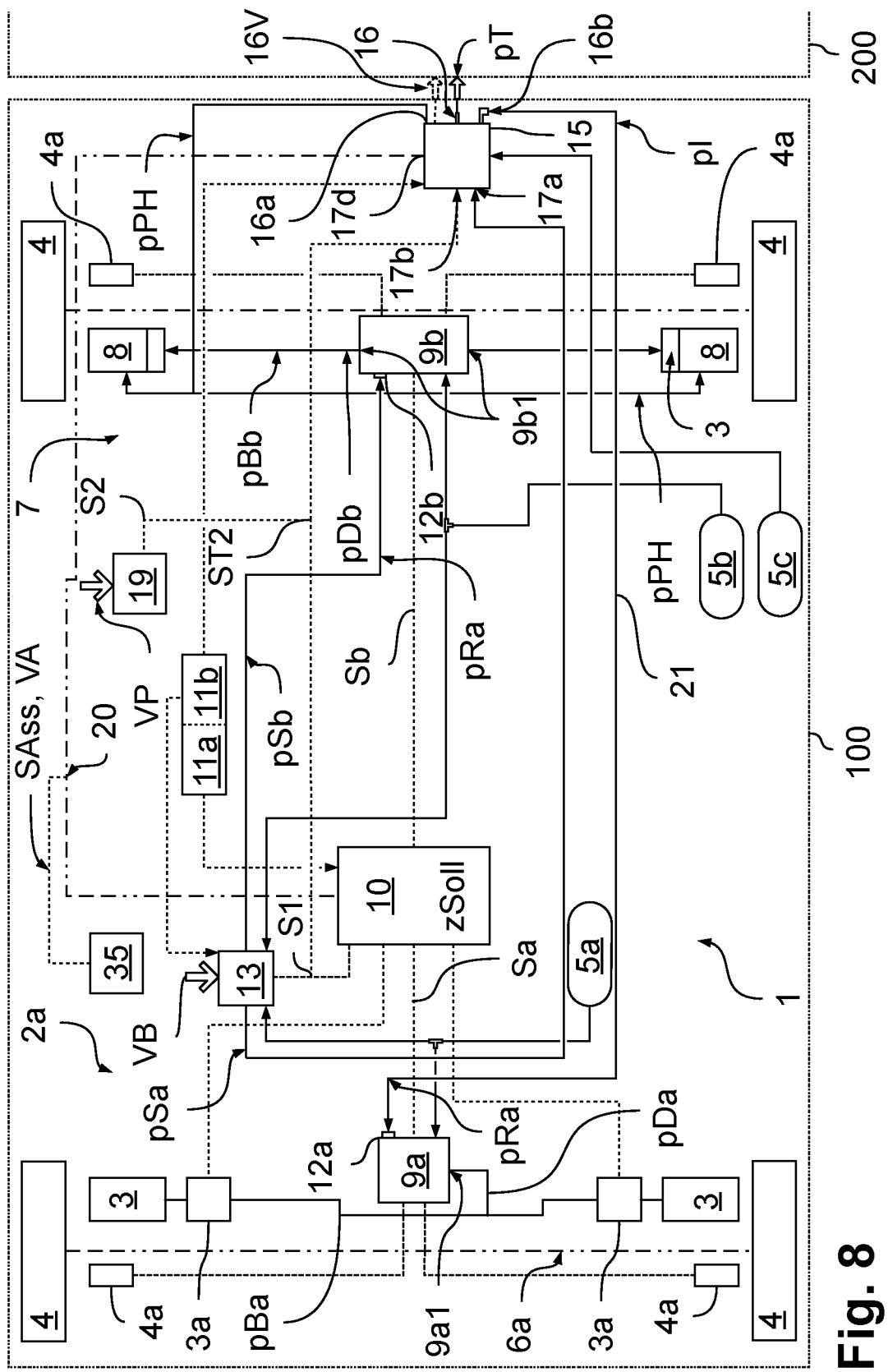
FIG. 8 shows an electronically controllable brake system with an electrically controllable parking brake according to a further embodiment with an inverter control valve according to FIG. 7*c*.

The variant of the inverter control module 15 according to FIG. 7c can advantageously be used in a brake system 1 illustrated in FIG. 8. Accordingly, the front-axle service-brake control pressure pSa is transmitted to the inverter control valve 15 via the first inverter input 17a, and here the second inverter control signal ST2 is transmitted, with a service-brake braking specification VB (service-brake activation signal S1) which is specified electrically by the service brake valve 13, via the second inverter input 17b and parking-brake braking specification VP (parking-brake activation signal S2) which is specified electrically by the parking-brake activation device 19. The assistance braking specification VA which is requested in an automated fashion and transmitted via the CAN bus 20 is transmitted to the inverter control valve 15 via the fourth inverter input 14d.

In the inverter control valve 15, the respective electrically transmitted braking specification VA, VB, VP is converted, under control by the parking-brake control module 18 and/or inverter control module 28, by the pilot control module 29 into an inverter control pressure pI in order to output the latter both as a trailer control pressure pT to a trailer 200 via the inverter output 16, and depending on the switching-valve switched position X1, X2 of the inverter switching valve 14c to the front-axle service brake circuit 2a via the redundancy output 16b and the redundancy pressure line 21. By means of the service-brake braking request VB transmitted via the second inverter control signal ST2 it is therefore also possible to transmit it to the trailer 200 as a trailer control pressure pT.

The respective control module 18, 28 which is integrated in the inverter control valve 15 can define here whether the braking specifications VA, VB, VP which are specified electrically via the fourth inverter input 14d or the second inverter input 14b are to be implemented, or the braking specification specified in the form of the front-axle service-brake control pressure pSa is to be implemented via the first inverter input 17a. This can take place either by means of active actuation of the inverter switching valve 14c which is embodied in this case as a 3/2-way valve 40b, in particular as a function of the braking-request signal S3 which is output by the pressure sensor 31, and/or by virtue of the fact that when there is a corresponding braking request signal S3 a low inverter control pressure pl is generated by the pilot control module 29 by controlled ending of the braking process which has already been specified and requested in an automated fashion, and in the case of an inverter switching valve 14c which is embodied as a shuttle valve 40a this leads to a situation in which the latter is switched automatically into the first switching-valve switched position X1, and as a result the front-axle service-brake control pressure pSa is applied by the inverter control valve 15 via the redundancy output 16b.

Analogously, this structure can also be provided in a brake system 1 in a way comparable to FIG. 4, i.e. with a pneumatic parking brake via which the parking-brake control pressure pSPH can also be transmitted to the inverter control valve 15, which in this case has an inverse relay valve 26 and a third inverter input 17c. This can ensure that in a brake system 1 with a pneumatic parking brake an assistance braking specification VA, requested in an automated fashion, can also be transmitted via the inverter control valve 15, and the inverter switching valve 14c can be transmitted to the front-axle service brake circuit 2a, if an electrical failure has occurred in the latter and the assistance braking specification VA therefore cannot be applied directly to the front-axle service brake circuit 2a via the service-brake control module 10. This is advantageous, in particular, even when the driver does not intervene himself via a manual braking specification VB, VP via the service brake valve 13 or the parking brake valve 24 when there is an electrical failure, and said braking specification VB, VP is therefore not transmitted redundantly to the front-axle service brake circuit 2a via the inverter control valve 15.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS (PART OF THE DESCRIPTION)

1 Brake system
2a Front-axle service brake circuit
2b Rear-axle service brake circuit
3 Service brakes
3a ABS control valves
4 Wheels
4a Wheel speed sensors
5a Front-axle pressure medium reservoir
5b Rear-axle pressure medium reservoir
5c Parking-brake pressure medium reservoir
6a Front axle
6b Rear axle
7 Parking brake circuit
8 Spring-loaded brakes
9a Front-axle pressure modulator
9a1 Front-axle pressure-modulator output
9b Rear-axle pressure modulator
9b1 Rear-axle pressure-modulator output
10 Service-brake control module
11a First energy source
11b Second energy source
12a Pneumatic front-axle redundancy port
12b Pneumatic rear-axle redundancy port
13 Service brake valve
14a Front-axle switching valve
14a1 First front-axle switching-valve input
14a2 Second front-axle switching-valve input
14a3 Front-axle switching-valve output
14b Rear-axle switching valve
14b1 First rear-axle switching-valve input
14b2 Second rear-axle switching-valve input
14b3 Rear-axle switching-valve output
14c Inverter switching valve
14c1 First inverter switching-valve input
14c2 Second inverter switching-valve input
14c3 Inverter switching-valve output
15 Inverter valve
15a Trailer control valve
16 Inverter output
16a Parking brake output
16b Redundancy output
16V Reservoir pressure output
17a First inverter input
17b Second inverter input
17c Third inverter input
17d Fourth inverter input
18 Parking-brake control module
19 Parking-brake activation device
20 CAN bus
21 Redundancy pressure line
22 Shutoff valve
23 Bleeding port 24 Parking brake valve
25 Relay valve
26 Inverse relay valve
28 Inverter control module
29 Pilot control module
31 Pressure
35 Assistance control module
40a Shuttle valve
40b 3/2-way valve
100 Vehicle
200 Trailer
pBa Front-axle brake pressure
pBb Rear-axle brake pressure
pDa Front-axle pressure-modulator output pressure
pDb Rear-axle pressure-modulator output pressure
pI Inverter control pressure
pPH Parking-brake control pressure
pRa Front-axle redundancy pressure
pRb Rear-axle redundancy pressure
pSa Front-axle service-brake control pressure
pSb Rear-axle service-brake control pressure
pSPH Parking-brake control pressure
pSU Switching control pressure
pT Trailer control pressure
Service-brake activation signal
S2 Parking-brake activation signal
S3 Braking request signal
SAss Assistance control signal
Sa Front-axle service-brake control signal
Sb Rear-axle service-brake control signal
SD Diagnostic signal
ST1 First inverter control signal
ST2 Second inverter control signal
SU Switching signal
SZ Shutoff signal
VA Assistance braking specification
VB Service-brake braking specification
VP Parking-brake braking specification
X1 First switching-valve switched position
X2 Second switching-valve switched position
Z1 First shutoff-valve switched position
Z2 Second shutoff-valve switched position
zSoll Vehicle setpoint deceleration

The invention claimed is:

1. An electronically controllable brake system, in particular electronically controllable pneumatic brake system, for a vehicle, in particular utility vehicle, comprising:
   at least one service brake circuit with service brakes and a service brake control module, a service-brake brake pressure being feedable to the service brakes, the service-brake control module being configured to generate a service-brake control signal as a function of a braking specification, the service-brake brake pressure being generatable as a function of the service-brake control signal and specified to the service brakes, for implementation of the braking specification via the at least one service brake circuit, under electrical control by the service-brake control module;
   a parking brake circuit with spring-loaded brakes, a parking-brake brake pressure being feedable to the spring-loaded brakes, the parking-brake brake pressure being generatable as a function of the braking specification and specified to the spring-loaded brakes, in order to implement the braking specification via the parking brake circuit;
   an inverter control valve with an inverter output and/or a redundancy output, the inverter control valve being configured to generate an inverter control pressure and to output the inverter control pressure via the inverter output and/or the redundancy output, the inverter control pressure being inversely proportional to the parking-brake brake pressure and/or a parking-brake control pressure which specifies the parking-brake brake pressure, which parking-brake brake pressure and parking-brake control pressure are applyable in order to implement the braking specification in the parking brake circuit via the spring-loaded brakes; and
   a switching valve, the switching valve having two switching-valve switched positions, such that when a service-brake specification which is requested manually by a driver via a service brake valve is present, the switching valve is set to a first switching-valve switched position in which switched position the service-brake brake pressure is specifiable as a function of the service-brake braking specification which is specified via the service brake valve, and otherwise the switching valve being set a second switching-valve switched position in which the service-brake brake pressure is specifiable as a function of the inverter control pressure which is specified by the inverter control valve.

2. The electronically controllable brake system of claim 1, wherein a pressure sensor is provided in the brake system, preferably in the inverter control valve, wherein the pressure sensor is configured to measure a service-brake control pressure which is output by the service brake valve as a result of the service-brake braking specification, and to output a braking request signal as a function of the measurement, wherein the switching valve is configured to switch into the first switching-valve switched position of the switching valve under electrical control as a function of the braking request signal when a service brake specification which is requested manually by the driver via the service brake valve is present, and/or the switching valve is configured to switch into the first switching-valve switched position under pneumatic control by the service-brake control pressure when a service brake specification which is requested manually by the driver via the service brake valve is present.

3. The electronically controllable brake system of claim 2, wherein the switching valve comprises a shuttle valve or an electrically or pneumatically controllable 3/2-way valve,
   wherein the shuttle valve is configured to set the first or the second switching-valve switched position optionally as a function of whether the inverter control pressure or the service-brake control pressure is higher,
   wherein the first switching-valve switched position is set if the service-brake control pressure is higher,
   wherein the 3/2-way valve is switchable into the first switching-valve switched position or into the second switching-valve switched position as a function of an electrically specified switching signal or of a pneumatically specified switching control pressure, and
   wherein the switching signal or the switching control pressure is generatable as a function of whether a requested service-brake braking specification is present in the at least one service brake circuit via the service brake valve in order to switch into the first switching-valve switched position if a service-brake braking specification is present via the service brake valve.

4. The electronically controlled brake system of claim 1, wherein the braking specification comprises an assistance braking specification which is specified in an automated fashion by an assistance control module and/or a parking-brake braking specification which is specified manually via a parking-brake activation device or via a parking brake valve and/or comprises the service-brake braking specification which is specifiable manually via the service brake valve.

5. The electronically controllable brake system of claim 1, wherein a parking-brake control module for outputting the parking-brake brake pressure as a function of the braking specification specified to the parking brake circuit is arranged in the parking brake circuit.

6. The electronically controllable brake system of claim 5, wherein the parking-brake control module is connected to the spring-loaded brakes of the parking brake circuit in order to pneumatically transmit the parking-brake brake pressure to the spring-loaded brakes, and/or
wherein the parking-brake control module is connected to the inverter control valve in order to pneumatically transmit the parking-brake brake pressure or a pressure dependent thereon which is generated in the parking-brake control module to the inverter control valve.

7. The electronically controllable brake system as claimed of claim 5, wherein the parking-brake control module is integrated into the inverter control valve, and the braking specification is electrically transmittable to the inverter control valve,
wherein the inverter control valve is configured
to generate the parking-brake brake pressure via the parking brake control module on a basis of the braking specification and to apply it to the spring-loaded brakes in the parking brake circuit via a parking brake output, and
to generate the inverter control pressure via an inverter control module and a pilot control module on a basis of the braking specification and to output it to the inverter output and/or the redundancy output, and
wherein the parking-brake brake pressure which is output via the parking brake output is inversely proportional to the inverter control pressure which is output via the inverter output and/or the redundancy output.

8. The electronically controllable brake system of claim 4, wherein the parking brake valve is configured to generate an output of the parking-brake control pressure as a function of the parking-brake braking specification which is manually specified.

9. The electronically controllable brake system of claim 8, wherein
the parking brake valve is connected to a relay valve, and the relay valve being configured to generate the parking-brake brake pressure from the parking-brake control pressure, the relay valve being connected to the spring-loaded brakes of the parking brake circuit in order to pneumatically transmit the parking-brake brake pressure, applied by the relay valve, to the spring-loaded brakes, and/or
wherein the parking brake valve is connected to the inverter control valve in order to pneumatically transmit the parking-brake control pressure or a pressure dependent thereon to the inverter control valve.

10. The electronically controllable brake system of claim 1, further comprising an inverse relay valve arranged in the inverter control valve in order to invert the parking-brake brake pressure which is pneumatically transmitted to the inverter control valve by the parking-brake control module and/or in order to invert the parking-brake control pressure which is pneumatically transmitted by the parking brake valve or to invert a pressure which is generated as a function thereof in order to generate an inverter control pressure which is inversely proportional to the parking-brake brake pressure and/or the parking-brake control pressure.

11. The electronically controllable brake system of claim 10, wherein the inverter control valve comprises a trailer control valve,
wherein the trailer control valve configured to generate a trailer control pressure which is dependent on the parking-brake brake pressure and/or on the parking-brake control pressure and to transmit it to a trailer via the inverter output, and
wherein the trailer control pressure is inversely proportional to the parking-brake brake pressure and/or to the parking-brake control pressure, and the trailer control pressure corresponds to the inverter control pressure.

12. The electronically controllable brake system of claim 1, further comprising a pressure modulator arranged in the at least one service brake circuit, the pressure modulator having a pressure modulator output, the pressure modulator being configured to generate a pressure-modulator output pressure as a function of the service-brake control signal and to output it via the pressure modulator output, the pressure-modulator output pressure being transmittable as a service-brake brake pressure to the service brakes of the at least one service brake circuit,
wherein the pressure modulator comprises a pneumatic redundancy port, and optionally for the pneumatic redundancy port the inverter control pressure or a service-brake control pressure, applied by an electro-pneumatic service brake valve on the basis of a service-brake braking specification, specifiable as a redundancy pressure, which for this purpose the switching valve is connected upstream of the redundancy port,
wherein
in the first switching-valve switched position the switching valve is configured to output the service-brake control pressure which is applied by the service brake valve on a basis of the service-brake braking specification, and
wherein in the second switching-valve switched position the switching valve is configured to output the inverter control pressure which is generated in the inverter control valve, as a redundancy pressure, to the redundancy port, in order to redundantly actuate the pressure modulator.

13. The electronically controllable brake system of claim 12, wherein the switching valve is arranged in the at least one service brake circuit
wherein in the first switching-valve switched position the switching valve connects the service brake valve to the redundancy port in order to redundantly specify the service-brake control pressure as a redundancy pressure to the redundancy port, and
wherein in the second switching-valve switched position the switching valve connects the inverter output of the inverter control valve to the redundancy port, in order to redundantly specify the inverter control pressure as a redundancy pressure to the redundancy port.

14. The electronically controllable brake system of claim 13, wherein the service brake valve is connected in a pressure-conducting fashion to a first switching valve input of the switching valve, and the inverter output is connected in a pressure-conducting fashion to a second switching valve input of the switching valve, and a switching valve output of the switching valve is connected in a pressure-conducting fashion to the redundancy port of the pressure modulator, and wherein in the first switching-valve switched position the first switching valve input is connected to the switching valve output, and in the second switching-valve switched position the second switching-valve input is connected to the switching valve output.

15. The electronically controllable brake system of claim 12, further comprising an inverter switching valve configured as a switching valve in or on the inverter control valve,
wherein in the first switching-valve switched position the inverter switching valve connects the service brake valve to the redundancy output of the inverter control valve,
wherein in the second switching-valve switched position the inverter switching valve outputs the inverter control pressure, which is generated in the inverter control valve, to the redundancy output, and
wherein the redundancy output of the inverter control valve is connected to the redundancy port of the pressure modulator.

16. The electronically controllable brake system of claim 15, wherein the service brake valve is connected in a pressure-conducting fashion to a first inverter switching-valve input of the inverter switching valve, the inverter control pressure is feedable to the second inverter switching-valve input of the inverter switching valve, an inverter switching-valve output of the inverter switching valve is connected in a pressure-conducting fashion to the redundancy output of the inverter control valve, and the redundancy output of the inverter control valve is connected in a pressure-conducting fashion to the redundancy port of the pressure modulator, and
wherein in the first switching-valve switched position the first inverter switching-valve input is connected in a pressure-conducting fashion to the inverter switching-valve output, and in the second switching-valve switched position the second inverter switching-valve input is connected in a pressure-conducting fashion to the inverter switching-valve output.

17. The electronically controllable brake system of claim 12, wherein, if a specification of the service-brake brake pressure fails as a function of a service-brake control signal, the pressure modulator is configured to generate the pressure-modulator output pressure as a function of the service-brake control pressure, which is optionally fed to the redundancy port, or as a function of the inverter control pressure.

18. The electronically controllable brake system of claim 1, further comprising a shutoff valve,
wherein in a first shutoff-valve switched position the shutoff valve prevents application of the service-brake braking pressure to the service brakes as a function of the inverter control pressure which is generated in the inverter control valve,
wherein in a second shutoff-valve switched position the shutoff valve permits the regulation as a function in order to redundantly implement the braking specification via the at least one service brake circuit,
wherein in the first shutoff-valve switched position the shutoff valve is configured to bleed a redundancy pressure line running between the inverter output or the redundancy output of the inverter control valve and the at least one service brake circuit and/or the service brakes.

19. The electronically controllable brake system of claim 18, wherein the shutoff valve is integrated into the inverter control valve or is arranged in the redundancy pressure line, connected downstream of the inverter output or the redundancy output of the inverter control valve.

20. The electronically controllable brake system of claim 18, wherein the switching valve comprises the shutoff valve, and
wherein in the first the switching-valve switched position the switching valve is configured to bleed the redundancy pressure line and/or the service brakes.

21. The electronically controllable brake system of claim 1, wherein the at least one service brake circuit is supplied with energy by a first energy source and the parking brake circuit and/or the inverter control valve is supplied with energy by a second energy source, and
wherein the first energy source is independent of the second energy source.

22. The electronically controllable brake system of claim 1, wherein the brake system is connected to a CAN bus of the vehicle, and the braking specification is transmittable via the CAN bus to the at least one service brake circuit and/or the parking brake circuit and/or the inverter control valve in the brake system.

23. The vehicle, in particular the utility vehicle, having the electronically controllable brake system of claim 1.

24. A method for controlling the electronic brake system of claim 1, comprising:
detecting whether the braking specification is implementable via the at least one service brake circuit and under electrical control by the service-brake control module;
generating the inverter control pressure in the inverter control valve as a function of a braking specification which is specified to the parking brake circuit; and
if implementation of the braking specification via the at least one service brake circuit under electrical control by the service-brake control module is not possible,
switching the switching valve into a first switching-valve switched position in which generation of the service-brake brake pressure in the at least one service brake circuit as a function of the service-brake braking specification which is specified via the service brake valve is made possible if a service-brake braking specification which is specified via the service brake valve is present, and otherwise
switching the switching valve into a second switching-valve switched position in which generation of the service-brake brake pressure as a function of the inverter control pressure which is specified by the inverter control valve is made possible.

25. The method of claim 24, wherein the inverter control pressure in the inverter control valve is generated as a function of the parking-brake brake pressure which is generated in the parking brake circuit on a basis of the braking specification, or the parking-brake control pressure, which for this purpose an inverter control pressure which is inversely proportional to the parking-brake brake pressure or the parking-brake control pressure is generated in the inverter control valve and transmitted to the switching valve in order to redundantly actuate the respective service brake circuit with the inverter control pressure when the second switching-valve switched position has been adjusted.

26. The method of claim 24, wherein a presence of a service-brake braking specification which is specified via the service brake valve is sensed, and the switching valve is switched into the first switching-valve switched position when a service-brake braking specification which is specified via the service brake valve is present,
wherein the sensing of the service-brake braking specification takes place via a pressure sensor which measures a service-brake control pressure which is output by the service brake valve as a result of the service-brake braking specification, and outputs a braking request signal as a function of the measurement, and the switching valve is switched into the first switching-valve switched position under electrical control as a function of the braking request signal, if a service-brake braking request is present via the service brake valve, and/or wherein the switching valve is switched into the first switching-valve switched position under pneumatic control by the service-brake control pressure when a service brake specification which is requested manually by the driver via the service brake valve is present.

27. The method of claim 26, wherein, when the service-brake braking specification which is specified via the service brake valve is present, the switching valve is switched into the first switching-valve switched position only if the inverter control pressure which is applied via the second switching-valve switched position is lower, owing to a redundant braking specification, than the service-brake control pressure which is applied in the first switching-valve switched position, owing to the service-brake braking specification.

28. The electrically controllable brake system of claim 2, wherein the function of whether the requested service-brake braking specification is present in the at least one service brake circuit via the service brake valve comprises a function of the braking request signal or of the service-brake control pressure.

29. The electrically controllable brake system of claim 13, wherein the switching valve is arranged in the at least one service brake circuit on a vehicle axle which is assigned to the at least one service brake circuit.

\* \* \* \* \*